(12) United States Patent
Kim et al.

(10) Patent No.: US 9,097,900 B2
(45) Date of Patent: Aug. 4, 2015

(54) QUANTITATIVE PHASE MICROSCOPY FOR HIGH-CONTRAST CELL IMAGING USING FREQUENCY DOMAIN PHASE SHIFT

(75) Inventors: Evgenia Mikhailovna Kim, Ballston Lake, NY (US); Robert John Filkins, Niskayuna, NY (US); Chulmin Joo, Kyunggi-do (KR)

(73) Assignee: General Electric Company, Niskayuna, NY (US)

( * ) Notice: Subject to any disclaimer, the term of this patent is extended or adjusted under 35 U.S.C. 154(b) by 393 days.

(21) Appl. No.: 13/523,816

(22) Filed: Jun. 14, 2012

(65) Prior Publication Data
US 2013/0335548 A1    Dec. 19, 2013

(51) Int. Cl.
| | |
|---|---|
| G01B 9/02 | (2006.01) |
| G02B 21/00 | (2006.01) |
| G02B 21/14 | (2006.01) |
| G01B 9/04 | (2006.01) |
| G02B 21/36 | (2006.01) |

(52) U.S. Cl.
CPC ...... *G02B 21/14* (2013.01); *G01B 9/04* (2013.01); *G02B 21/361* (2013.01); *G01B 2290/20* (2013.01); *G02B 21/0088* (2013.01)

(58) Field of Classification Search
CPC .... G01B 9/04; G01B 2290/20; G02B 21/088; G02B 21/14; G02B 21/361
USPC .................. 356/450, 456, 521; 359/370, 371
See application file for complete search history.

(56) References Cited

U.S. PATENT DOCUMENTS

| | | | |
|---|---|---|---|
| 5,241,364 A | 8/1993 | Kimura | |
| 5,260,569 A | 11/1993 | Kimura | |
| 5,459,576 A * | 10/1995 | Brunfeld et al. | 356/520 |
| 5,751,475 A | 5/1998 | Ishiwata et al. | |
| 6,317,261 B1 * | 11/2001 | Otaki | 359/387 |
| 7,365,858 B2 | 4/2008 | Fang-Yen et al. | |
| 7,546,210 B2 * | 6/2009 | Callahan et al. | 702/19 |
| 7,812,959 B1 | 10/2010 | Kim | |
| 2004/0125442 A1 | 7/2004 | Yun et al. | |
| 2009/0290156 A1 | 11/2009 | Popescu et al. | |
| 2010/0053740 A1 * | 3/2010 | Nishiwaki | 359/370 |
| 2011/0032608 A1 * | 2/2011 | Suenaga | 359/386 |
| 2013/0162800 A1 * | 6/2013 | Kim et al. | 348/79 |

OTHER PUBLICATIONS

Daaboul et al.,"LED-Based Interferometric Re.ectance Imaging Sensor for Quantitative Dynamic Monitoring of Biomolecular Interactions", Biosensors and Bioelectronics, pp. 1-7, 2010.
Haldar et al.,"Deconvolved Spatial Light Interference Microscopy for Live Cell Imaging", IEEE Transactions on Biomedical Engineering, vol. 58, Issue 9, Sep. 2011.

(Continued)

*Primary Examiner* — Michael A Lyons
(74) *Attorney, Agent, or Firm* — Eileen B. Gallagher

(57) ABSTRACT

Some systems described herein include a frequency dependent phase plate for generating multiple phase-contrast images of a sample, each from a different frequency range of light, each phase-contrast image for frequency range of light formed from light diffracted by the sample interfered with undiffracted light that has a frequency-dependent baseline relative phase shift from the phase plate. In some embodiments, the multiple phase-contrast images may be used to generate a quantitative phase image of a sample. The phase-contrast images or the produced quantitative phase image may have sufficient contrast for label-free auto-segmentation of cell bodies and nuclei.

27 Claims, 16 Drawing Sheets

(56) References Cited

OTHER PUBLICATIONS

Haldar et al.,"Label-Free High-Resolution Imaging of Live Cells With Deconvolved Spatial Light Interference Microscopy",Conference Proceedings IEEE Engineering in Medicine and Biology Society, pp. 3382-3385, 2010.

Maurer et al., "Refining Common Path Interferometry with a Spiral Phase Fourier filter", Journal of Optics A: Pure and Applied Optics, 11 094023, 2009.

Maven Biotechnologies, White Paper on Label Free Internal Reflection Ellipsometry, pp. 1-8, downloaded Mar. 20, 2012, available at http://www.mavenbiotech.com/whitepaper.htm.

Przibilla et al.,"Investigations on Label-Free Identification of Subcellular Tumor Cell Structures by Digital Holographic Phase Contrast Microscopy",DGaO—Proceedings, 2009.

Rodrigo et al., "Accurate Quantitative Phase Imaging Using Generalized Phase Contrast", Optics Express, vol. 16, No. 4, Feb. 18, 2008.

Waller et al., "Phase From Chromatic Aberrations", Optics Express, vol. 18, No. 22. Oct. 25, 2010.

Wang et al.,"Label-Free Intracellular Transport Measured by Spatial Light Interference Microscopy", Journal of Biomedical Optics,vol. 16, Issue 2, Feb. 2011.

Yamauchi et al.,"Label-Free Classification of Cell Types by Imaging of Cell Membrane Fluctuations using Low Coherent Full-Field Quantitative Phase Microscopy", Proceedings of SPIE—New Developments in Microscopy, vol. 7500, 2010, San Francisco, California, USA.

International Search Report and Written Opinion issued in connection with corresponding PCT Application No. PCT/SE2013/050671 dated Nov. 18, 2013.

* cited by examiner

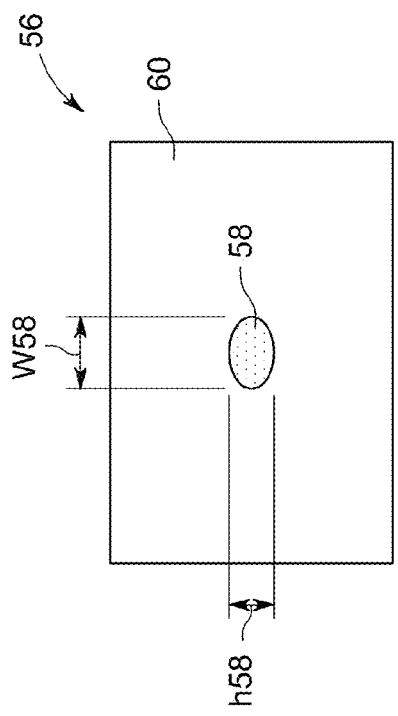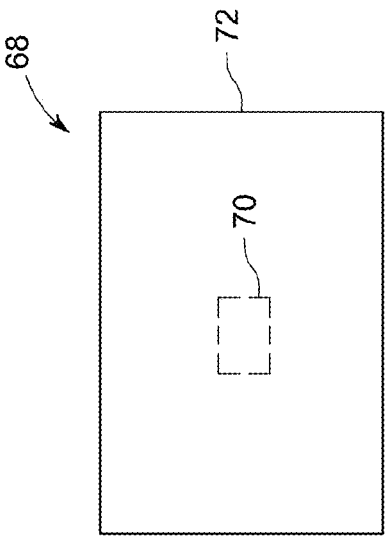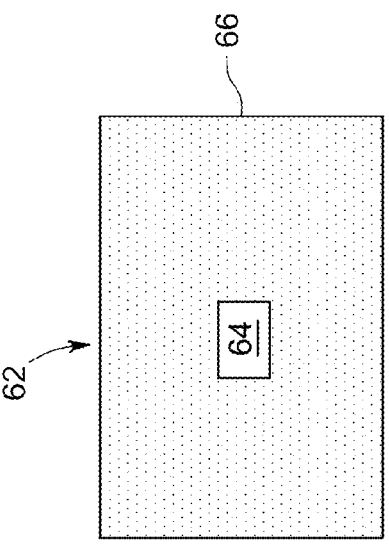

QUANTITATIVE PHASE MICROSCOPY FOR HIGH-CONTRAST CELL IMAGING USING FREQUENCY DOMAIN PHASE SHIFT

FIELD

The embodiments relate generally to phase contrast microscopy. More specifically, some embodiment relate to quantitative phase microscopy for high-contrast cell imaging.

BACKGROUND

The identification of borders of cell bodies and/or cell nuclei in a microscopy image of a sample may be referred to as segmentation of cell bodes and/or nuclei in the image. To image structures of cells in a sample (e.g., for segmentation), staining or labeling techniques are often used to enhance contrast between different types of cell structures. For example, a specimen may be stained with dyes that react with DNA or RNA (e.g., ethidium bromide), or dyes that interact differently with the nucleus and the cytoplasm of a cell (e.g., hematoxylineosin). As another example, labels, which may be one or more colored agents (chromopores) and/or or one or more fluorescent agents (fluorophores), are useful in identifying a desired substance in a cell structure based on the presence of a specific tag. Such staining and labeling techniques aid in the identification of cell structures; however, staining or labeling using external contrast agents may affect the structure or other properties of interest of the sample being imaged. Further, in general, such staining or labeling cannot be performed on live cells.

Conventional phase-contrast imaging techniques (e.g., Zernike, different interference contrast (DIC)) enable imaging of cell monolayers with improved contrast as compared with bright-field imaging. These phase-contrast techniques, which do not require staining or labeling, generally can provide sufficient image contrast, but at the expense of additional optical components, light sources and alignment procedures.

Conventional phase imaging can be approximated as processing a series of traditional transmitted light images (e.g., by subtraction of in and out of focus images). While providing an image with enhanced edge features, the contrast is often not sufficient to insure reliable automated segmentation of cells and/or nuclei. Further, for samples that change, move or evolve in time, producing a phase image from a series of sequential images may not be practical.

Further, neither conventional optical imaging with labels and stains, nor conventional phase-contrast imaging provides quantitative thickness information regarding cell monolayers.

SUMMARY

Exemplary embodiments relate to methods and systems for producing quantitative phase images of samples and for producing high contrast phase images of samples. Some embodiments may be employed for producing high contrast quantitative phase images of biological samples. The produced high contrast phase images and quantitative phase images of biological samples may have sufficient contrast for label-free automated segmentation of cell bodies and/or nuclei in the image. The quantitative phase images may also provide information regarding sample thicknesses at various locations. The spatially resolved thickness information may provide sufficient information about cell conditions so as to make image segmentation unnecessary. Some embodiments may be employed for producing high contrast phase images or quantitative phase images at a sufficiently high capture rate for probing samples that evolve in time. Some embodiments may be employed for producing high contrast phase images or quantitative phase images of a sample and simultaneously producing fluorescence images of a sample.

An embodiment includes a system for phase contrast imaging. The system includes at least one collection optical element in a beam path after a sample illuminated by a light source. The at least one collection optical element is configured to collect light diffracted by the sample and to collect light not diffracted by the sample. The system also includes a first optical element in the beam path after the at least one collection optical element configured to focus the undiffracted light to a focal plane. The system further includes a phase plate at or near the focal plane configured to transmit at least a portion of the diffracted light. The phase plate is also configured to transmit and impart a first phase shift to a first portion of the undiffracted light having a frequency in a first frequency range, and transmit and impart a second phase shift to a second portion of the undiffracted light having a frequency in a second frequency range different than the first frequency range. The system also includes a second optical element in the beam path after the phase plate configured to image the transmitted diffracted light and the transmitted undiffracted light onto an imaging system. In some embodiments the phase plate is also configured to transmit and impart a third phase shift to a third portion of the undiffracted light having a frequency in a third frequency range different than the first frequency range and different from the second frequency range. The third phase shift is different than the first phase shift and the second phase shift.

In some embodiments, the first phase shift and the second phase shift are selected from 0, $\pi/2$, $\pi$, and $3\pi/2$. In some embodiments, first frequency range and the second frequency range are selected from a frequency range for red light, a frequency range for blue light, and a frequency range for green light. In some embodiments, the third frequency range is also selected from a frequency range for red light, a frequency range for blue light, and a frequency range for green light.

In some embodiments, the imaging system is a multiple frequency range imaging system. The imaging system may be an RGB camera. In some embodiments, the imaging system is a monochromatic imaging system. In some embodiments, the system further includes a light source for producing light having a frequency in the first frequency range and light having a frequency in the second frequency range.

In some embodiments, the phase plate includes a liquid crystal. In some embodiments, the phase plate has a central region including a highly dispersive material and a peripheral region including a less dispersive material. The highly dispersive material may include indium tin oxide (ITO). The highly dispersive material including ITO may have a thickness of between 100 nm and 800 nm in the central region. The highly dispersive material including ITO may have a thickness of between 240 nm and 400 nm in the central region. The highly dispersive material may include titanium nitride (TiN). The highly dispersive material including TiN may have a thickness of between 50 nm and 500 nm in the central region. The highly dispersive material including TiN may have a thickness of between 110 nm and 215 nm in the central region. The central region of the phase plate may have lateral dimensions of between 50 microns and 600 microns. The central region of the phase plate may have lateral dimensions of between 50 microns and 350 microns.

In some embodiments, system is configured for label-free, high-contrast imaging of samples including one or more cells.

In some embodiments, the system is configured to produce phase-contrast images of samples with sufficient contrast for auto-segmentation.

In some embodiments, the at least one collection optical element is further configured to collect fluorescent light emitted by the sample. The system may further include a dichroic element for dividing light from the at least one collection optical element into a first beam including light from the first light source diffracted by the sample and light from the first light source that is not diffracted by the sample, and a second beam including fluorescence light emitted by the sample. The first optical element, the phase plate and the second optical element may be along a path of the first beam. The system may further include one or more optical elements in a path of the second beam configured to focus the fluorescent light onto a second imaging system. In some embodiments, the system further includes at least one fluorescence collection optical element configured to collect fluorescent light emitted by the sample.

Another embodiment includes system for phase contrast imaging. The system includes at least one collection optical element in a beam path after a sample illuminated by a monochromatic light source, the at least one collection optical element configured to collect light diffracted by the sample and to collect light not diffracted by the sample. The system also includes a first optical element in the beam path after the at least one collection optical element configured to focus the undiffracted light to a focal plane. The system further includes a phase plate at or near the focal plane. The phase plate includes a peripheral region configured to transmit at least a portion of the diffracted light, and a central region including a highly dispersive material. The central region may be configured to transmit and impart a first phase shift to at least a portion of the undiffracted light having a frequency in a first frequency range corresponding to the monochromatic light source. The system may further include a second optical element in the beam path after the phase plate configured to image the transmitted diffracted light and the transmitted undiffracted light onto an imaging system. In some embodiments, the phase shift is selected from π/2, π, and 3π/2. In some embodiments, the system further includes a monochromatic camera.

In some embodiments, the phase plate includes a liquid crystal. In some embodiments, the phase plate of has a central region including a highly dispersive material and a peripheral region including a less dispersive material. The highly dispersive material may include indium tin oxide (ITO). The highly dispersive material including ITO may have a thickness of between 100 nm and 800 nm in the central region. The highly dispersive material including ITO may have a thickness of between 240 nm and 400 nm in the central region. The highly dispersive material may include titanium nitride (TiN). The highly dispersive material including TiN may have a thickness of between 50 nm and 500 nm in the central region. The highly dispersive material including TiN may have a thickness of between 110 nm and 215 nm in the central region. The central region of the phase plate may have lateral dimensions of between 50 microns and 600 microns. The central region of the phase plate may have lateral dimensions of between 50 microns and 350 microns.

Another embodiment includes a system for phase contrast imaging. The system includes at least one collection optical element in a beam path after a sample that is illuminated by a light source. The at least one collection optical element is configured to collect light diffracted by the sample and to collect light not diffracted by the sample. The system further includes a first optical element in the beam path after the at least one collection optical element configured to focus the undiffracted light to a focal plane. The system also includes a phase plate at or near the focal plane configured to transmit at least a portion of the undiffracted light and transmit and impart a first phase shift to a first portion of the diffracted light having a frequency in a first frequency range, the first phase shift being relative to a phase of the transmitted undiffracted light. The phase plate is also configured to transmit and impart a second phase shift to a second portion of the diffracted light having a frequency in a second frequency range different than the first frequency range. The system further includes a second optical element in the beam path after the phase plate configured to image the transmitted undiffracted light and the transmitted diffracted light onto an imaging system. In some embodiments, the phase plate includes a peripheral region including a highly dispersive material and central region including a less dispersive material.

An embodiment includes a system for phase contrast imaging. The system includes at least one collection optical element in a beam path after a sample illuminated by a monochromatic light source. The at least one collection optical element is configured to collect light diffracted by the sample and to collect light not diffracted by the sample. The system further includes a first optical element in the beam path after the at least one collection optical element configured to focus the undiffracted light to a focal plane. The system further includes a phase plate at or near the focal plane. The phase plate includes a central region configured to transmit at least a portion of the undiffracted light, and a peripheral region including a highly dispersive material. The peripheral region is configured to transmit and impart a first phase shift to at least a portion of the diffracted light having a frequency in a first frequency range corresponding to the monochromatic light source, the first phase shift being relative to a phase of the transmitted undiffracted light. The system further includes a second optical element in the beam path after the phase plate configured to image the transmitted diffracted light and the transmitted undiffracted light onto an imaging system.

Another embodiment includes a method. The method includes capturing a first phase contrast image of a sample from light in a first frequency range diffracted by the sample interfering with light in the first frequency range undiffracted by the sample and given a first relative phase shift by a phase plate. The method further includes capturing a second phase contrast image of the sample from light in a second frequency range diffracted by the sample interfering with light in the second frequency range undiffracted by the sample and given a second relative phase shift by a phase plate. The second frequency range is different than the first frequency range and the second relative phase shift is different than the first relative phase shift. The method also includes capturing a third phase contrast image of the sample from light in a third frequency range diffracted by the sample interfering with light in the third frequency range undiffracted by the sample and given a third relative phase shift by a phase plate. The third frequency range is different than the first frequency range and the second frequency range, and the third relative phase shift is different than the first relative phase shift and the second relative phase shift. In some embodiments, the first phase contrast image, the second phase contrast image and the third phase contrast image are captured simultaneously. In some embodiments, the method further includes producing a quantitative phase image from the first phase contrast image, the second phase contrast image and the third phase contrast image. In some embodiments, the sample includes one or more cells and the quantitative phase image is a label-free, high-contrast image of the sample.

BRIEF DESCRIPTION OF DRAWINGS

Features and aspects of embodiments are described below with reference to the accompanying drawings, in which elements are not necessarily depicted to scale.

FIG. 6 schematically depicts a phase plate with an oval central region, in accordance with some embodiments.

FIG. 7 schematically depicts a phase plate with a peripheral region including a highly dispersive material, in accordance with some embodiments.

FIG. 8 schematically depicts a phase plate including a liquid crystal, in accordance with some embodiments.

DETAILED DESCRIPTION

Some embodiments are described herein relative to a system and method for quantitative phase imaging or high contrast phase imaging. Some example embodiments simultaneously generate multiple phase-contrast images with various relative phase shifts between light diffracted by a sample and light not diffracted by the sample to obtain a quantitative phase image that is relatively free from artifacts. Some embodiments provide phase-contrast microscopy systems and methods that provide quantitative optical thickness information regarding thin biological samples (e.g., cell monolayers). Some embodiments may provide sufficient image contrast to perform label-free automated segmentation of cell bodies and/or nuclei.

In some embodiments, a monochromatic light source is used to illuminate a sample and a phase plate imparts a phase shift to light diffracted by the sample or to light not diffracted by the sample to generate a high contrast phase-contrast image on a monochromatic camera. Some embodiments provide a system for performing both quantitative phase-contrast microscopy of a same, or high contrast phase-contrast microscopy of the sample, and fluorescence microscopy on the sample.

Figure 1:
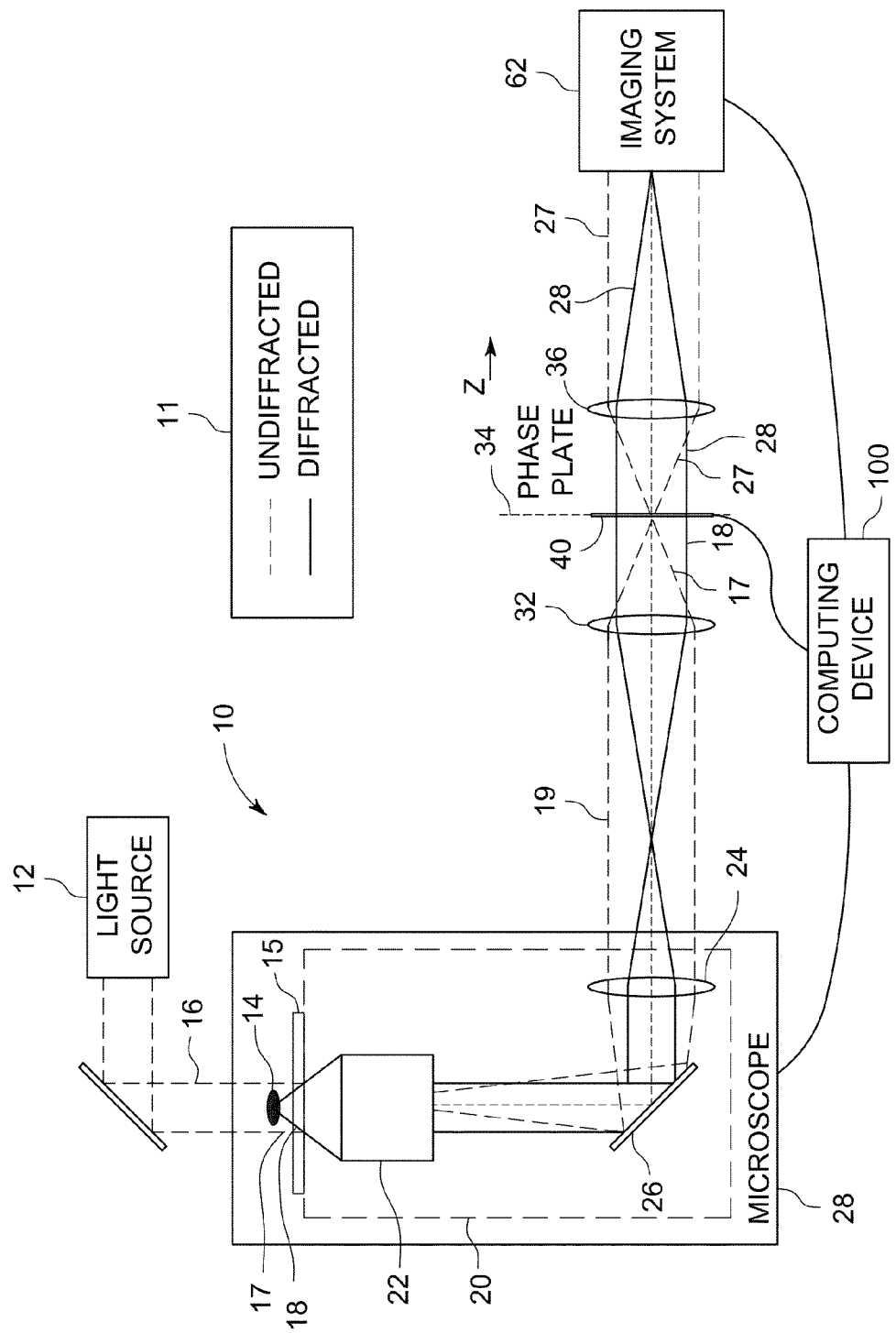
FIG. 1 schematically depicts an exemplary system for phase-contrast imaging, in accordance with some embodiments.

FIG. 1 schematically represents two different types of exemplary systems for phase contrast imaging. The first type of exemplary system employs light having different frequency ranges to produce multiple phase-contrast images that can be combined to produce a two-dimensional quantitative phase image, in accordance with some embodiments. The second type of exemplary system for performing high contrast phase-contrast (PC) imaging employs light from a single frequency range source to produce a high contrast phase-contrast image, in accordance with some embodiments. FIG. 1 is first described with respect to the exemplary system for performing quantitative phase-contrast microscopic imaging using light from multiple frequency ranges, which may be described as quantitative phase microcopy (QPM) herein.

System 10 includes a light source 12 for illuminating a sample 14 with a beam of light 16. In some embodiments, the light source 12 is a 3-color coherent light source (e.g., one or more lasers, laser diodes, pulse lasers, superluminescent laser diodes, etc.). In some embodiments, various optical elements, such as lenses and filters, may be included in the light source 12 or positioned between the light source 12 and the sample 14.

The sample 14 illuminated by the light source may be a translucent or transparent sample. In some embodiments, the sample may be a dry sample (e.g., on a coverslip) or a wet sample (e.g., live cells in a chamber). In some embodiments, the sample may be in a micro titer plate or in a t225 flask. In some embodiments, the sample may be between 2 microns and 10 microns thick depending on wavelength of light used.

The illuminating beam of light 16 produced the light source 12 interacts with the sample 14 resulting in light that is diffracted by the sample (diffracted light) 18 and light that is not diffracted by the sample (undiffracted light) 17. The diffracted light 18 and the undiffracted light 17 are collected by at least one main beam optical element 20, in the path of the beam 16 after the sample 14. As indicated by the legend 11, in the present diagram, light diffracted by the sample is depicted with solid lines, and light that is not diffracted by the sample is depicted with broken lines. In some embodiments, the at least one main beam optical element 20 may include an objective 22, a tube lens 24, or both, as shown. As illustrated, one or more transparent or translucent optical elements 15 (e.g., a glass slide, a coverslip, a chamber window, etc.) may separate the at least one main beam optical element 20 from the sample 14.

In some embodiments, the at least one main beam optical element 20 for collecting light may be a portion of a microscope 28 (e.g., the microscope objective 22 and the tube lens 24). In some embodiments, the light source 12 may be part of the microscope 28, may be separate from the microscope 28, or may be partially incorporated into the microscope 28. The microscope 28 may further include one or more mirrors (e.g., mirror 26) for directed the diffracted light 18 and the undiffracted light 17. The microscope may be connected to and/or in communication with a computing device 100. The computing device 100 is described in more detail below with respect to FIG. 12.

A first optical element (e.g., lens 32) in the path of the collected light (diffracted light 18 and undiffracted light 17) focuses the undiffracted light 17 at a focal plane 34. In other embodiments, multiple lenses or one or more other types of optical elements (e.g., curved minors) may be used to focus the first undiffracted light 17.

Figure 4:
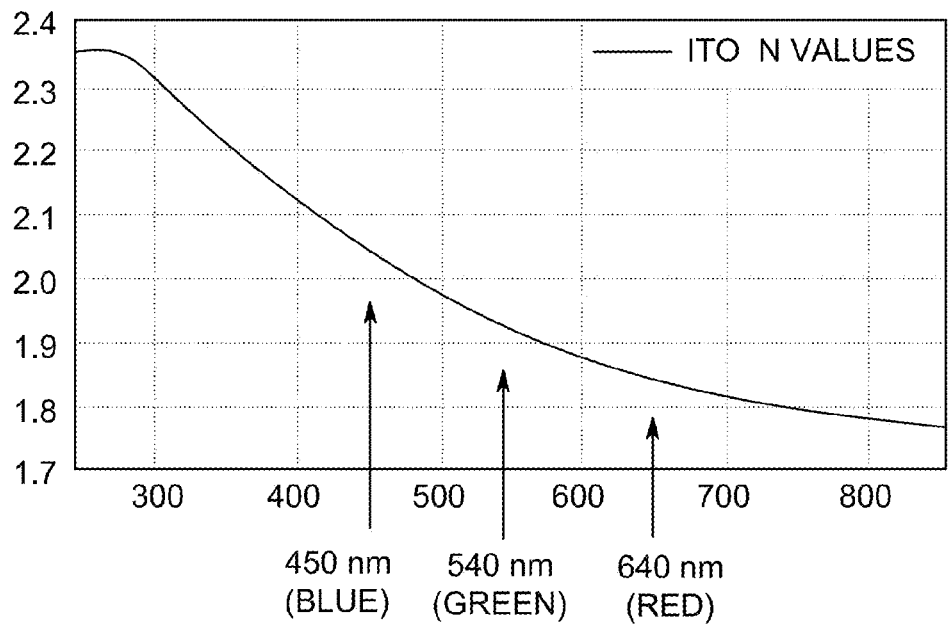
FIG. 4 is a graph of refractive index versus wavelength for indium tin oxide (ITO).
Figure 5:
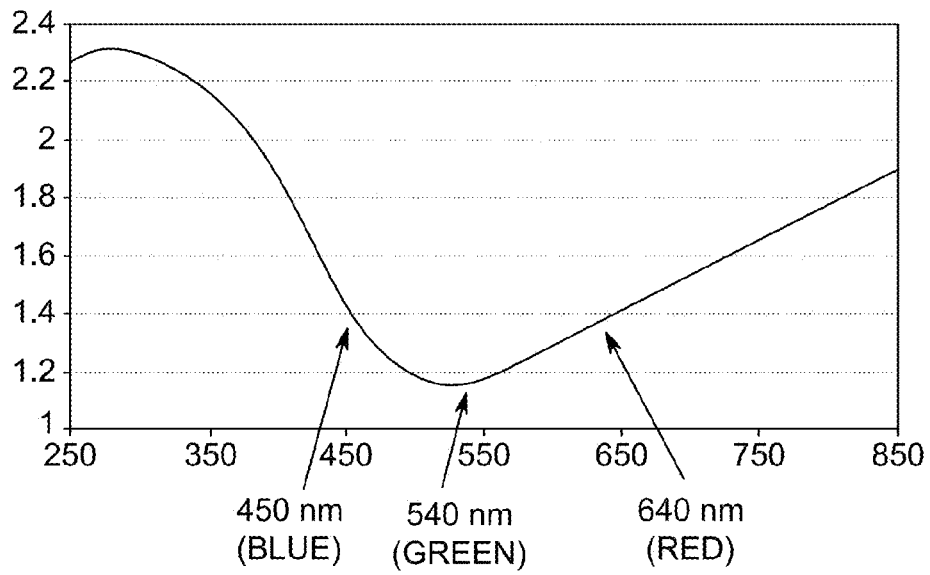
FIG. 5 is a graph of refractive index versus wavelength for titanium nitride (TiN).

A phase plate 40 at the focal plane 34 imparts a relative phase shift between the undiffracted light 17 and the diffracted light 18. For a phase plate of a given thickness and material, the relative phase shift depends on the frequency range of the light, as explained below with respect to FIGS. 4-5. In some embodiments, the phase shift for a frequency range is selected from 0, π/2, π, and 3π/2. After the phase plate 40, a second optical element (e.g., lens 36) may be used to collimate the undiffracted beam portion 27, which is phase shifted relative to the diffracted beam 28 after the phase plate 40. In some embodiments, the second optical element (e.g., lens 36) may have a focal length that is about equal to a focal length of the first optical element (e.g., lens 32).

After the second optical element 36, the diffracted beam 28 and the undiffracted beam 27 are combined at a two dimensional imaging system 62 where interference between the diffracted beam 28 and the undiffracted beam 27 produces a phase-contrast image. In some embodiments, the imaging system is a multiple frequency range imaging system that produces multiple phase-contrast images, each corresponding to interference between the diffracted beam 28 and the undiffracted beam 27 for light in a wavelength range. For example, the imaging system 62 could be an RGB camera for capturing three different phase-contrast images simultaneously: one for a red frequency range (e.g., a range around 640 nm wavelength), one for a green frequency range (e.g., a range around 540 nm), and one for a blue frequency range (e.g., a range around 450 nm).

Figure 2:
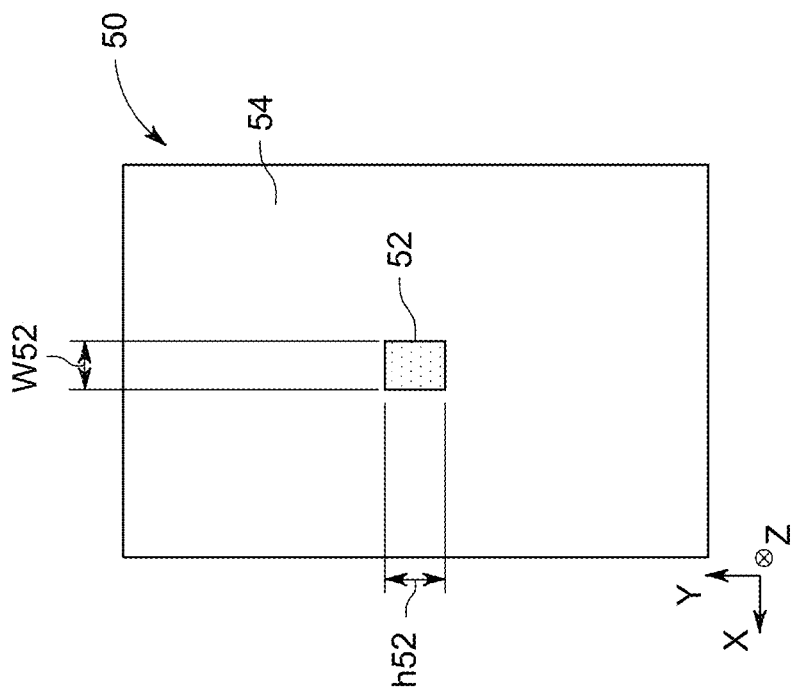
FIG. 2 schematically depicts a phase plate in accordance with some embodiments.

FIGS. 2, 3, and 6-8 schematically depict different designs for phase plates. In FIG. 2, a phase plate 50 has a central region 52 including a highly dispersive material (e.g., indium tin oxide (ITO) or titanium nitride (TiN)) and a peripheral region 54 including a less dispersive material (e.g., silica glass, soda-lime glass, fused quartz, borosilicate glass, lead-oxide glass, aluminosilicate glass, air, etc.). In system 10, undiffracted light 17 is focused at focal plane 34 such that it is incident on the central region 52 of the phase plate. The highly dispersive material in the central region 52 imparts a phase shift to the undiffracted light 17 incident on the central region relative to the diffracted light 18 incident on the peripheral portion 54, which does not include a highly dispersive material. The amount of relative phase shift depends on the wavelength of the undiffracted light, with light of different wavelengths being shifted by different amounts. As recognized by one of ordinary skill in the art, a property that is dependent on the wavelength of light is also dependent on the frequency of the light as the frequency and the wavelength are inversely proportional. Thus, something described as wavelength dependent may also, or alternatively, be described as frequency dependent.

Figure 3:
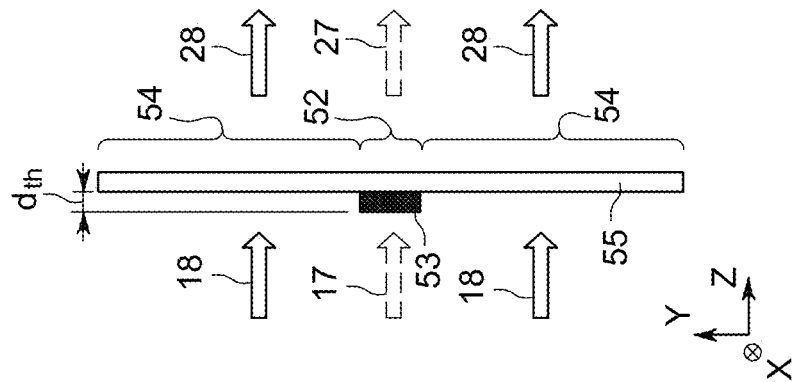
FIG. 3 schematically depicts a side view of the phase plate of FIG. 2.

As schematically depicted in FIG. 3, the central region 52 of the phase plate may include a thin film 53 of a highly dispersive material on a substrate 55 of a less dispersive material, such as soda-lime glass. Thicknesses of the thin film 53 and of the substrate 55 are exaggerated for illustrative purposes. The peripheral region 54 may be a peripheral portion of the substrate 55 that does not include the thin film 53 of highly dispersive material. Any phase shift due to the less dispersive substrate will be about the same for both the undiffracted light 17 focused on the central region 52 and for the diffracted light 18 incident on the peripheral region 54, because both are transmitted through the same thickness of substrate resulting in about zero relative phase shift due to the less dispersive substrate 55. However, the undiffracted light 17 focused on the central region 52 will experience a frequency dependent phase shift due to the thin film 53 of the highly dispersive material, which is not experienced by the diffracted light 18 incident on the peripheral region 54. Thus, the central region 52 will impart a frequency-dependent, also described as wavelength-dependent, phase shift to the transmitted undiffracted light 27 relative to the transmitted diffracted light 28.

Imaging system 62 captures phase-contrast images for the undiffracted light 27 and the diffracted light 28 for each frequency range (e.g., a red image, a green image and a blue image). In some embodiments, the imaging system 62 may be configured to capture images for the various frequency ranges simultaneously. In other embodiments the imaging system 62 may capture images for the various frequency ranges sequentially.

The relative phase delay or relative phase shift δ between two beams of light having wavelength λ traveling the same physical distance $d_{th}$ through media having different refractive indices $n_1$, $n_2$ is described by the following equation:

$$\delta = \frac{2\pi}{\lambda}(n_2 - n_1)d_{th} \tag{1}$$

If the first medium is air and the second medium is a highly dispersive material, the equation above may be written as $$\delta(\lambda) = \frac{2\pi}{\lambda}(n_{hd}(\lambda) - 1.00)d_{th} \tag{2}$$

where $d_{th}$ is the thickness of the highly dispersive material. The refractive index of the highly dispersive material $n_{hd}(\lambda)$ depends on the wavelength or the frequency of the incident light. For example, FIG. 4 includes a graph of the refractive index of ITO as a function of wavelength and FIG. 5 includes a graph of the refractive index of TiN as a function of wavelength. The refractive indices of ITO and TiN both vary substantially based on the wavelength of the light. Accordingly, red light, green light, and blue light transmitted through the central portion 52 of the phase plate will each experience a different relative phase delay compared to light of the same color transmitted through the peripheral portion 54 of the phase plate.

An image may be represented as interference between diffracted and undiffracted light from a sample according to the following equation, which does not include the effect of the phase plate:

$$I_0(x,y) = I_U + I_D + 2\sqrt{I_U I_U} \cos(\Delta\phi(x,y)) \tag{3}$$

where $I_0(x,y)$ is the phase contrast image intensity at each location, $I_U$ is the image intensity from the undiffracted light, $I_D$ is the image intensity from the diffracted light and $\Delta\phi(x,y)$ is phase shift at each two-dimensional location due to the sample. Although $I_U(x,y)$ and $I_D(x,y)$ are functions of location (x,y), they are merely represented by $I_U$ and $I_D$ in the equations above for simplicity.

The thickness $d_{th}$ of the highly dispersive material may be selected such that it imparts specific phase shifts for selected colors, frequencies or wavelengths of light. For example, the thickness of the highly dispersive material may be selected such that red light (about 640 nm in wavelength) experiences an additional constant phase shift $\delta_c$, such that green light (about 540 nm in wavelength) experiences an additional relative phase shift of the constant phase shift $\delta_c$ plus $\pi/2$, and such that blue light (about 450 nm in wavelength) experiences an additional relative phase shift of the constant phase shift $\delta_c$ plus $\pi$. The additional relative phase shifts due to the phase plate appear as the last two terms in the equations below for intensity.

$$I_{red}(x,y)=I_U+I_D+2\sqrt{I_U I_D}\cos(\Delta\phi(x,y)+\delta_c) \quad (4)$$

$$I_{green}(x,y)=I_U+I_D+2\sqrt{I_U I_D}\cos(\Delta\phi(x,y)+\pi/2+\delta_c) \quad (5)$$

$$I_{blue}(x,y)=I_U+I_D+2\sqrt{I_U I_D}\cos(\Delta\phi(x,y)+\pi\delta_c) \quad (6)$$

If the phase plate is configured such that red light provides the best phase contrast image, then the additional constant phase shift $\delta_c$ should be about $\pi$. If the phase plate is configured such that green light provides the best contrast, then the additional constant phase shift $\delta_c$ should be about $\pi/2$. If the phase plate is configured such that blue light provides the best contrast, then the additional constant phase shift $\delta_c$ should be about 0. Equations (4)-(6) above for measured intensity at the detector as a function of lateral position for the three colors ($I_{red}$, $I_{green}$, $I_{blue}$) may be combined yielding an equation for quantitatively determining phase from the measured intensities. For example, if the additional constant phase shift $\delta_c$ is $\pi$, the equation for quantitative phase shift due to the sample is:

$$\Delta\phi(x,y)=-\tan^{-1}[(I_{red}+I_{blue}-2I_{green})/(I_{red}-I_{blue})] \quad (7)$$

Equation (7) for quantitative phase above may be used to determine the phase shift due to the sample $\Delta\phi(x,y)$ at each location (x,y) to create a quantitative phase image. Example quantitative phase images are described below with respect to FIGS. 13 and 14.

Turning again to FIG. 1, imaging system 62 captures a phase-contrast image for the undiffracted light 27 and the diffracted light 28 for each frequency range (e.g., a red image, a green image and a blue image). In some embodiments, the imaging system 62 may be configured to capture images for the various frequency ranges simultaneously. In other embodiments the imaging system 62 may capture images for the various frequency ranges sequentially. The imaging system may be any 2-D imaging device with suitable resolution, (e.g., a charge coupled device (CCD) camera, a photomultiplier tube (PMT) camera, a high resolution video camera, or other imaging device suitable resolution). In some embodiments, the 2-D imaging system (e.g., camera 62) may be configured to provide the images or image data to a computing device 100 for analysis. As used herein, the term "image" may refer to one or both of a displayed image, and data or information corresponding to an image. Thus, obtaining an image may refer to obtaining an analog image or obtaining data corresponding to a digital image. Further, data corresponding to an image may be raw image data, processed image data (e.g., filtered, smoothed, cropped), compressed image data, etc. Further, the image data may be stored or transmitted in a variety of formats (e.g., JPG, bitmap, postscript, etc.), as would be appreciated by one of skill in the art In some embodiments, the imaging system 62, the microscope 28 and/or the light source 12 may be controlled using one or more computing devices 100, (see description of FIG. 12 below). In some embodiments, the computing device 100 may be used to calculate quantitative phase based on the phase images for the various frequency ranges. In some embodiments, computing device 100 may be used to store and/or display images based on the measured intensity data for different frequency ranges or based on the calculated quantitative phase data.

Exemplary system 10 enables acquisition of phase contrast images at a high rate. The acquisition rate may be limited by the frame rate of the imaging system or by the frame grabbing rate of an associated computing device. Unlike systems that use multiple sequential phase-contrast images to determine quantitative phase, the imaging system 62 of phase contrast system 10 may simultaneously acquire a set of phase-contrast images from which quantitative phase may be obtained. Thus, system 10 may be used to monitor the quantitative phase of samples that evolve in time (e.g., move, change shape, etc.).

A quantitative phase microcopy image produced in accordance with embodiments may have sufficient contrast and resolution to identify cell bodies for automated segmentation of cells, to perform automated cell counting and/or to perform automated calculations of cell size, cell nuclei density, and cell density. Further, in some embodiments, thickness information $h(x,y)$ may be generated from the quantitative phase information, $\Delta\phi(x,y)$, and the refractive index of the sample $n(x,y)$ based on the following equation.

$$\Delta h(x,y) = \frac{\lambda_0}{2\pi(n(x,y)+1)}\Delta\varphi(x,y) \quad (8)$$

For biological samples, the index of refraction may be approximately constant across different locations, or it may vary for different types of cells or cellular structures (e.g., nuclei, organelles, cell walls) at each location. For example, the index of refraction of different biological samples may vary, at least, over a range of 1.33 to 1.47. In samples having a large variation in index of refraction, a determination of thickness may require use of an index of refraction that varies by location (x,y). One of ordinary skill in the art will appreciate that known values for indices of refraction for various cells and cellular structures may be used to calculate thickness values from quantitative phase values. Often, a refractive index of a sample may be known and may not vary across the sample, simplifying the calculation of sample thickness.

Although system 10 with a multi-frequency light source and a multi-frequency imaging system may be capable simultaneously capturing images from different frequencies of light simultaneously, in some circumstances when quantitative phase information is not needed a phase-contrast image from one of the frequency ranges may be sufficient. For example, an RGB camera may be used to capture and store only phase-contrast images associated with red light. The phase contrast image from only one frequency may have sufficient resolution and contrast for various type of automated processing, such as automated segmentation of cell bodies and/or nuclei, automated cell counting, automated calculations of cell size, cell nuclei density, and/or cell density, etc.

Although phase plate 50 of FIGS. 2-3 is depicted as having a square central region 52 with a highly dispersive material for shifting a phase of the undiffused light, in other embodiments, a central region may be a shape other than square (e.g., rectangle, circle, oval, etc.) For example, phase plate 56 of FIG. 6 includes an oval central region 58 with a highly dispersive material and a peripheral region 60 with a less dispersive material.

Although phase plates 50 and 56 include a highly dispersive material in a central region for shifting a phase of the undiffused light, in other embodiments, a phase of the diffused light is shifted instead. For example, FIG. 7 shows a phase plate 62 with a highly dispersive material in a peripheral region 66 for shifting a phase of the diffused light relative to undiffused light transmitted through a central region 64 of the phase plate.

Although phase plates 50, 56 and 62 use a thin film of a highly dispersive material to effect the phase shift, in some embodiments, the material properties of the highly dispersive material may be controllable or changeable. For example, FIG. 8 schematically depicts a phase plate 68 including a liquid crystal with a central region 70 in which the index of refraction is controllable through an applied electromagnetic field. In some embodiments, at least a portion of a peripheral region 72 may also have a controllable index of refraction.

Turning again to FIG. 1, in some embodiments, system 10 may be a system for high resolution and high contrast phase-contrast imaging that does not employ multiple wavelength ranges of light. For example, light source 12 may be a monochromatic light source producing light in a selected frequency range. Phase plate 40 may be configured to produce a desired phase shift (e.g., $\pi/2$, $\pi$, $3\pi/2$) for incident light in the selected frequency range. Imaging system 62 may include a monochromatic imaging device. Although an embodiment that does not employ multiple wavelengths of light, may not produce quantitative phase information, the embodiment may have better resolution due to the absence of chromatic aberration and the availability of higher resolution monochromatic imaging devices.

In some embodiments, a monochromatic phase contrast imaging system 10 employing only one selected wavelength range of light may incorporate a phase plate 40 that produces a desired phase shift in the selected wavelength range, and that produces different desired phase shifts in two additional wavelength ranges. With such a phase plate designed for use with three different wavelengths of light, the monochromatic high resolution phase contrast imaging system may be easily converted to a multiple frequency range quantitative phase imaging system by replacing the light source and the imaging system.

Figure 9:
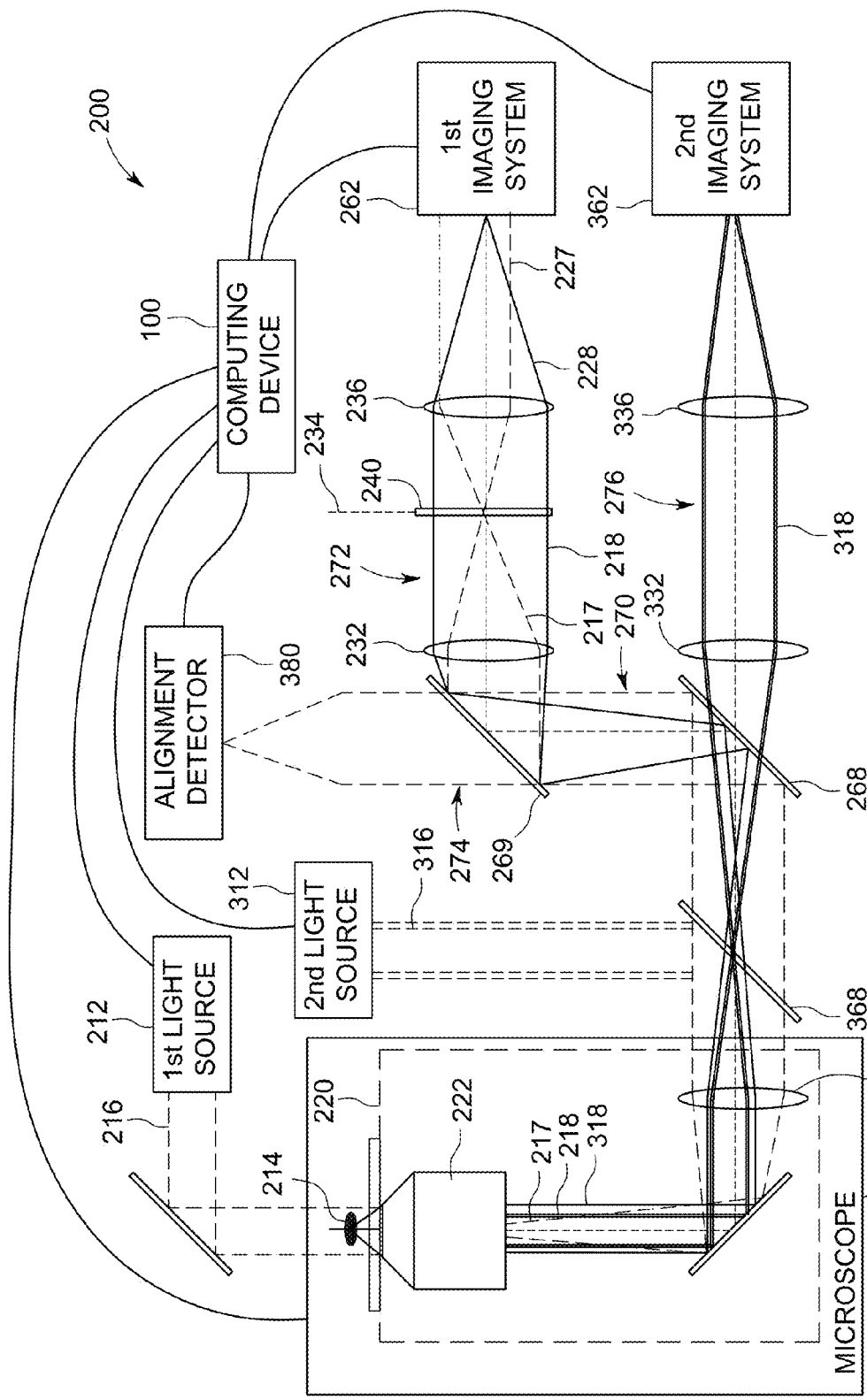
FIG. 9 schematically depicts a multimodal system for obtaining phase contrast images and fluorescence images of a sample, in accordance with some embodiments.

In some embodiments, a high resolution monochromatic phase contrast imaging system or a quantitative phase imaging system may be configured for fluorescence imaging as well. Such a system may be described as a multi-modal system. For example, FIG. 9 schematically depicts a multi-modal system 200 for performing phase contrast imaging (high contrast monochromatic phase-contrast imaging and/or multi-frequency phase contrast imaging for quantitative phase information) and fluorescence imaging of a sample. The multi-modal system 200 includes a first light source 212, which may be a monochromatic light source or a multi-frequency light source, for phase contrast imaging. The first light source 212 illuminates a sample 214 with a main beam 216 of light. Light from the first light source 212 that is diffracted by the sample 214 (diffracted light 218) and light that is not diffracted by the sample (undiffracted light 217) are collected by one or more collection optical elements 220. In some embodiments, the one or more collection optical elements 220 may include an objective 222, and a tube lens 224. In some embodiments, the one or more collection optical elements 220 may be part of a microscope 229. In some embodiments, the diffracted light 218 and the undiffracted light 217 may be reflected by a dichroic element forming a first beam portion 270. In some embodiments, the first beam portion 270 may be further divided into multiple parts including a phase imaging portion 272 and an alignment portion 274 by a beam splitter 269. A first optical element (e.g., lens 232) in a path of the phase imaging portion 272 focuses the undiffracted light 217 at a focal plane 234. A phase plate 240 positioned at or near the focal plane 234 includes a central region and a peripheral region. The central region of the phase plate 240 transmits and imparts a phase shift to the undiffracted light relative to the phase of the diffracted light transmitted through the peripheral region of the phase plate. A second optical element (e.g., lens 236) collimates the phase shifted undiffracted light 227 and focuses the diffracted light 228 onto the first imaging system 262, which may be a monochromatic imaging system or a multiple frequency band imaging system (e.g., an RGB camera). The first imaging system 262 captures phase-contrast images of the sample 214.

In some embodiments, the multi-modal system 200 may include an alignment detector 380 for aiding in the alignment of the focused diffracted light on the central portion of the phase plate 240. The alignment detector 380, which may be a may be a four quadrant detector or another suitable detector receives light from the alignment portion 274 of the beam.

The multimodal system 200 also performs fluorescence imaging of the sample 214. Multimodal system 200 includes a second light source 312 for illuminating the sample and causing emission of fluorescent light by the sample, in accordance with some embodiments. The second light source 312 may be a laser, (e.g., a high power laser diode or a nanosecond, picosecond or femtosecond pulsed laser, which may reduce photodamage and/or photobleaching). In other embodiments, a system may not include a second light source and the first light source may cause emission of sufficient fluorescent light by the sample. Light 316 from the second light source 312 may be reflected off of a second dichroic element 368 and directed through the one or more optical elements 220 to the sample 214. Fluorescent light 318 emitted by the sample may be collected using the same one or more collection elements 220 and directed through the second dichroic element 368 and through the first dichroic element 268 along a second beam path 276. A third optical element 332 and/or a fourth optical element 336 may be positioned along the second beam path 276 to focus the fluorescent light 318 onto a second imaging system 362. The second imaging system 362 may include any type of two-dimensional imaging device with sufficient resolution (e.g., a standard CCD cameras or electron multiplier CCD cameras, which may be useful for single molecule detection). Multi-modal system 200 can be used for obtaining one or more phase contrast image(s) and a fluorescence image of a sample simultaneously.

A computing device 100 may communicate with and/or control any or all of the first imaging system 262, the second imaging system 362, the alignment detector 380, the microscope 228, the first light source 212 and the second light source 312. In some embodiments, the computing device 100 may be used to calculate quantitative phase based on the phase images for the various frequency ranges. In some embodiments, computing device 100 may be used to store and/or display phase contrast images or data, and/or images or data based on the calculated quantitative phase data. In some embodiments, computing device 100 may be used to store and/or display images based on the fluorescence data.

Figure 10:
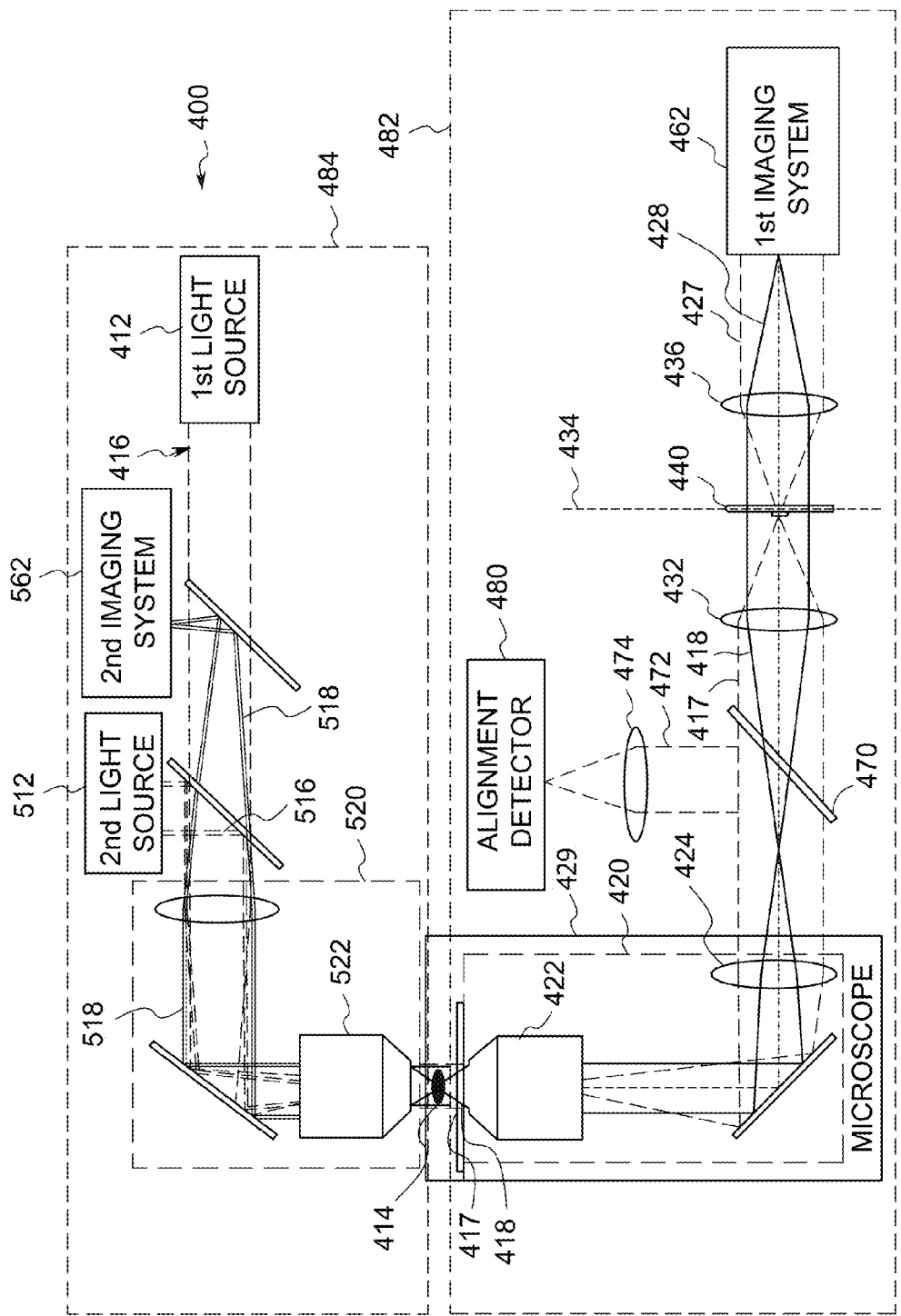
FIG. 10 schematically depicts another multi-modal system for obtaining phase contrast images and fluorescent images of a sample that includes one or more fluorescence collection element, in accordance with some embodiments.

FIG. 10 schematically depicts another multi-modal system 400 for performing phase contrast imaging (monochromatic phase-contrast imaging and/or multi-frequency phase contrast imaging for quantitative phase information) and fluorescence imaging of a sample in accordance with some embodiments. Multi-modal system 400 includes a first light source 412, which may be a monochromatic light source for single frequency band phase-contrast imaging or a multi-frequency band light source for quantitative phase imaging. A main beam of light 416 from the first light source 412 is directed through one or more fluorescence collection optical elements 520, which may include an objective 522, to illuminate a sample 414. Light from the first light source 412 that is diffracted by the sample 414 (diffracted light 418) and light that is not diffracted by the sample (undiffracted light 417) are collected by one or more collection optical elements 420. In some embodiments, the one or more collection optical elements 420 may include an objective 422, and a tube lens 424. In some embodiments, the one or more collection optical elements 220 may be part of a microscope 429.

A first optical element (e.g., lens 432) focuses the undiffracted light 417 at a focal plane 434. A phase plate 440 positioned at or near the focal plane 434 includes a central region and a peripheral region. The central region of the phase plate 440 transmits and imparts a phase shift to the undiffracted light relative to the phase of the diffracted light transmitted through the peripheral region of the phase plate 440. A second optical element (e.g., lens 436) collimates the phase shifted undiffracted light 427 and focuses the diffracted light 428 onto a first imaging system 462, which may be a monochromatic imaging system or a multiple frequency band imaging system (e.g., an RGB camera). The first imaging system 462 captures phase-contrast images of the sample 414.

In some embodiments, the undiffracted light 417 and the diffracted light 418 are split by a beam splitter before reaching the first optical element (e.g., lens 432) and a portion 478 of the undiffracted light and the diffracted light is directed into an alignment detector 480 to aid in alignment of the undiffracted light with the central region of the phase plate 440. In some embodiments, the alignment detector 480 may be a four quadrant detector. In some embodiments, a third optical element 474 may be used to focus the undiffracted light on the alignment detector 480. Optical components along path of light from the first light source after the sample may be considered a phase-contrast subsystem 282.

The multimodal system 200 also performs fluorescence imaging of the sample 414 using a fluorescence subsystem 484. Multimodal system 200 includes a second light source 512 for illuminating the sample 414 and causing emission of fluorescent light by the sample 440, in accordance with some embodiments. The second light source 512 may be a laser, (e.g., a high power laser diode or a nanosecond, picosecond or femptosecond pulsed laser, which may reduce photodamage and/or photobleaching). In other embodiments, a system may not include a second light source and the first light source may cause emission of sufficient fluorescent light by the sample. Light 516 from the second light source 512 may be directed through the one or more fluorescence optical elements 520 to the sample 414. Fluorescent light 518 emitted by the sample 414 may be collected using the one or more fluorescence optical elements 520 and directed to a second imaging system 562. The second imaging system 362 may be any kind of two-dimensional imaging device with sufficient resolution (e.g., a standard CCD cameras or electron multiplier CCD cameras, which may be useful for single molecule detection). Multi-modal system 200 can be used for obtaining one or more phase contrast image(s) and a fluorescence image of a sample simultaneously.

For clarity, a computing device has been omitted from FIG. 10. In some embodiments, a computing device (see FIG. 12) may be communication with and/or control any or all of the first imaging system 462, the second imaging system 562, the alignment detector 480, the microscope 429, the first light source 412 and the second light source 512.

Figure 11:
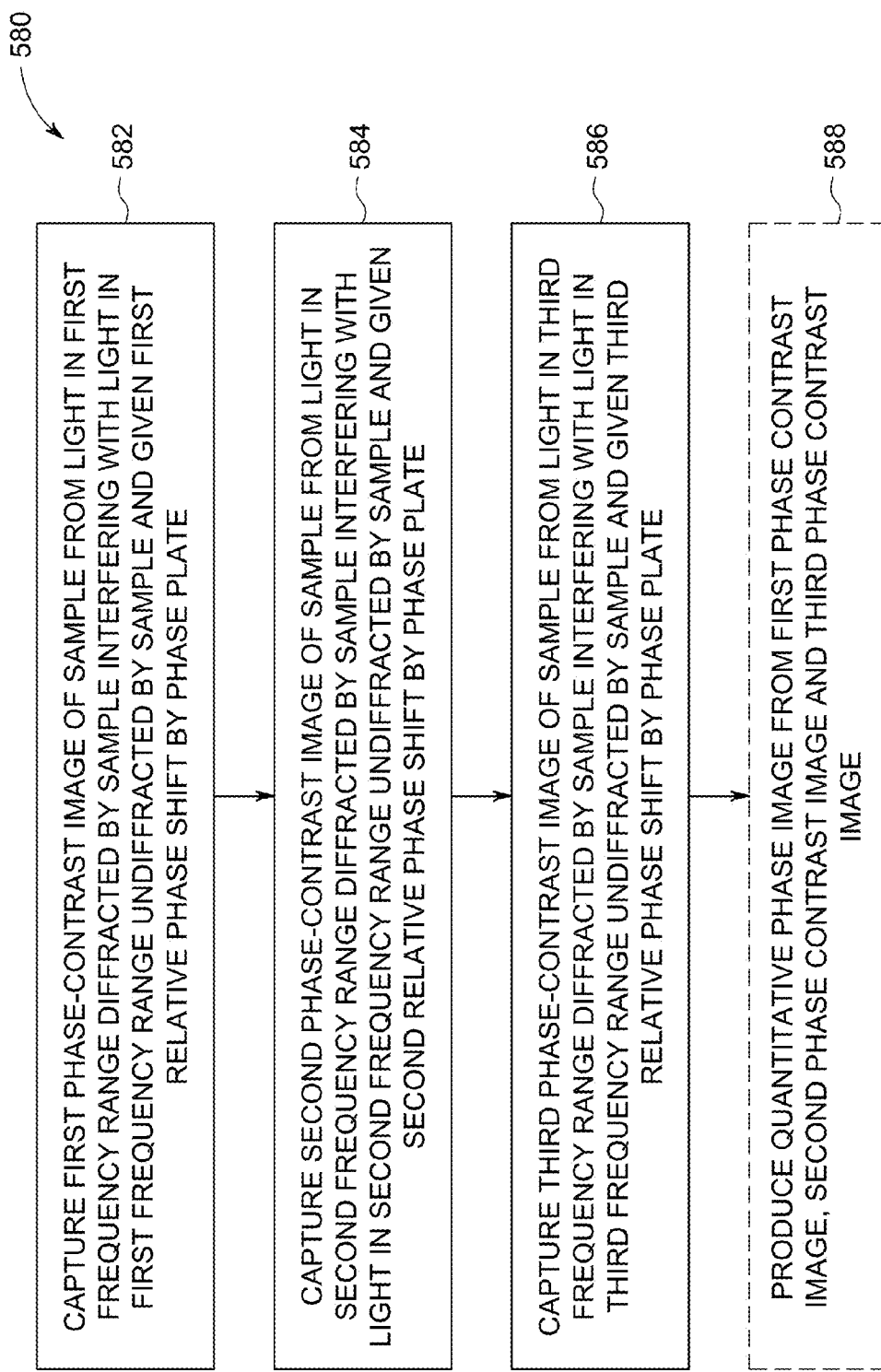
FIG. 11 is a flow diagram of a method in accordance with some embodiments.

FIG. 11 schematically depicts a flow chart of a method 580 for capturing phase contrast images in accordance with some embodiments. For illustrative purposes, the method 580 is described with respect to system 10 depicted in FIG. 1. However, other systems with other configurations may be used to perform method 580, as would be appreciated by one of skill in the art. A first phase contrast image is captured of a sample 14 from light in a first frequency range diffracted by the sample (e.g. first frequency range diffracted light 28) interfering with light in the first frequency range that was not diffracted by the sample and was given a first relative phase shift by a phase plate 34 (e.g., first frequency range phase-shifted undiffracted light 27) (step 582). For example, in some embodiments, the first frequency range is a frequency range of red light and the first relative phase shift is a baseline phase shift (e.g., $\pi$). A second phase contrast image is captured of the sample from light in a second frequency range that was diffracted by the sample (second frequency range diffracted light 28) interfering with light in the second frequency range that was not diffracted by the sample and was given a second relative phase shift by the phase plate (e.g., second frequency range phase-shifted undiffracted light 27) (step 584). The second frequency range is different than the first frequency range and the second relative phase shift is different than the first relative phase shift. For example, in some embodiments, the second frequency range is a frequency range of blue light and the second relative phase shift is the baseline phase shift plus $\pi/2$ (e.g., $3\pi/2$). A third phase contrast image is captured of the sample 14 from light in a third frequency range that was diffracted by the sample (third frequency range diffracted light 28) interfering with light in the third frequency range that was not diffracted by the sample and that was given a third relative phase shift by the phase plate (third frequency range phase shifted undiffracted light 27) (step 586). The third frequency range is different than the first frequency range and the second frequency range and the third phase shift is different than the first phase shift and the second phase shift. For example, in some embodiments, the third frequency range is a frequency range of green light and the third relative phase shift is the baseline phase shift plus it (e.g., $2\pi$, which is 0).

In some embodiments, the first phase contrast image, the second phase contrast image and the third phase contrast image are captured simultaneously. In some embodiments, the first relative phase shift, the second relative phase shift and the third relative phase shift are any of 0, $\pi/2$, $\pi$ and $3\pi/2$.

In some embodiments, the method further includes producing a quantitative phase image from the first phase contrast image, the second phase contrast image and the third phase contrast image (step 586). The quantitative phase image may be produced using the computing device described below with respect to FIG. 12. In some embodiments, the calculation of a quantitative phase value would be performed for each location (e.g., for each pixel or for each data point $(x_0, y_0)$). In other embodiments, the phase-contrast image data may be processed (e.g., averaged across a number of pixels to reduce the effects of noise) before the quantitative phase data is calculated. One of ordinary skill in the art will appreciate that many different computer programs and algorithms may be used to produce the quantitative phase data, or a quantitative phase image, from the phase-contrast image data.

In some embodiments, the method 580 may further include calculating a thickness of at least a portion of a sample based on at least a portion of the quantitative phase image data. The calculation may be a thickness at each location in the quantitative phase image, a thickness at each location for at least a portion of the locations in the quantitative phase image, or may be a profile along the quantitative phase image, which may average multiple lines of pixels to obtain the profile.

Figure 12:
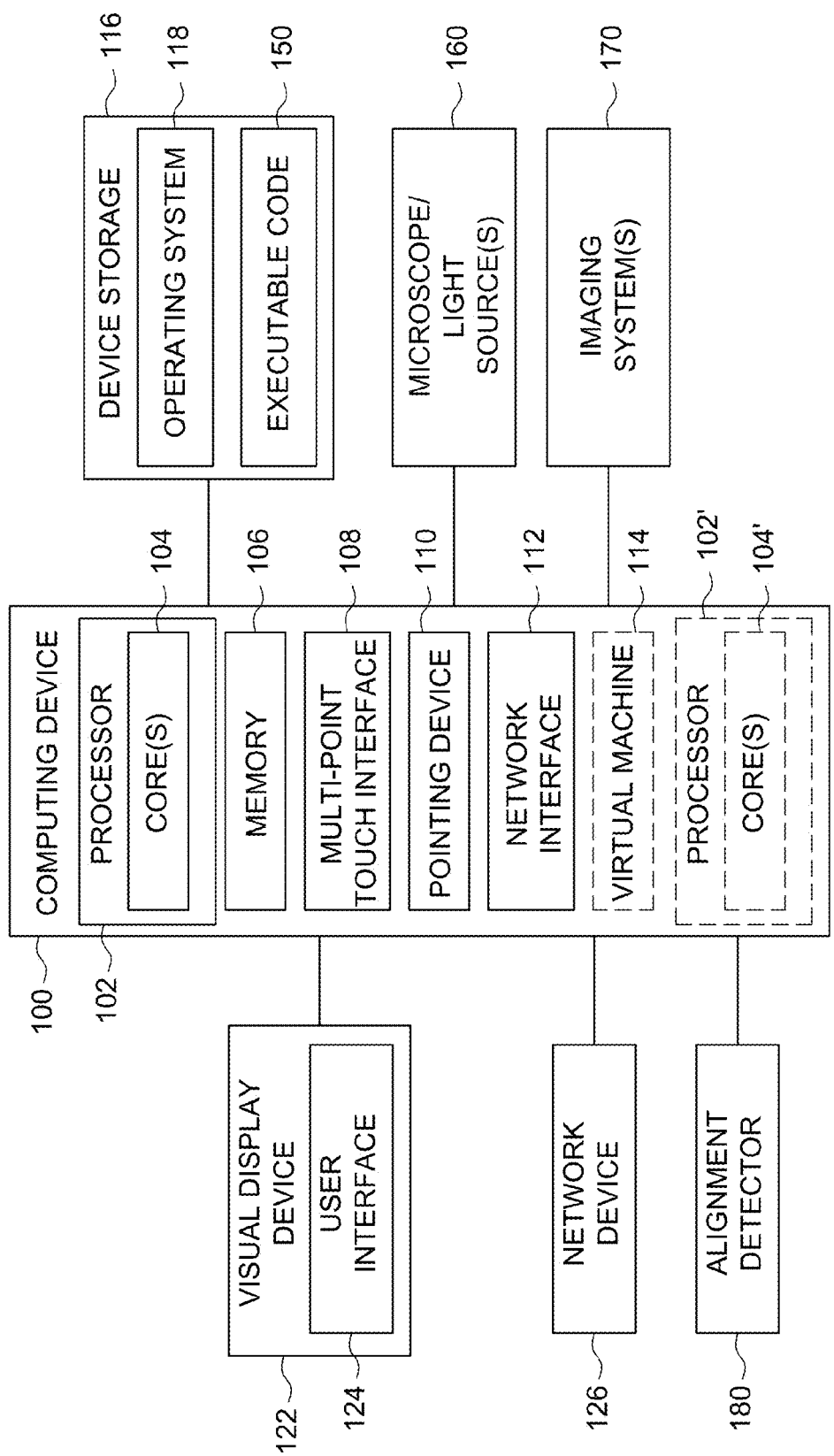
FIG. 12 schematically depicts a computing system for implementing some embodiments.

FIG. 12 illustrates an exemplary computing environment suitable for practicing embodiments, including exemplary methods and systems taught herein. The environment includes a computing device 100 with associated peripheral devices. Computing device 100 is programmable to implement executable code 150 for performing various methods, or portions of methods, taught herein. Computing device 100 includes a storage device 116, such as a hard-drive, CD-ROM, or other non-transitory computer readable media. Storage device 116 may store an operating system 118 and other related software. Computing device 100 may further include memory 106. Memory 106 may include a computer system memory or random access memory, such as DRAM, SRAM, EDO RAM, etc. Memory 106 may include other types of memory as well, or combinations thereof. Computing device 100 may store, in storage device 116 and/or memory 106, instructions for implementing and processing each portion of the executable code 150.

The executable code 150 may include code for analyzing phase-contrast images to produce quantitative phase images. In some embodiments, the executable code 150 may include image processing functionality (e.g., crop, smooth, filter, define region of interest, etc.) for processing phase-contrast images, quantitative phase images and/or fluorescence images. The executable code 150 may include code for displaying the phase-contrast images, the quantitative phase images and/or the fluorescence images. In some embodiments, the executable code 150 may include code for determining thickness information corresponding to one or more locations in a quantitative phase image.

In some embodiments, the executable code 150 may further include code for performing automated segmentation of cell bodies and/or cell nuclei based on a phase-contrast image and/or a quantitative phase image. One of ordinary skill in the art would understand that many known automated segmentation methods and techniques could be employed for automatic segmentation, which may include watershed feature detection, statistically driven thresholding, (e.g., Otsu, mean, MinError, Huang, triangles, and MinMax thresholding) and/or edge enhancing filters (e.g., unsharp masking, Sobel filtering, Gaussian filters, Kalman filters). In some embodiments, the executable code 150 may include functionality for user-assisted segmentation of cells and/or nuclei (e.g., tools allowing users to indicate cell boundaries or nuclei boundaries within a quantitative phase image). In other embodiments, segmentation may be performed entirely manually by a user. The executable code 150 may further include code for performing automated cell counting, automated calculation of cell size, automated calculation of nuclei density, and/or automated integration of density of the cells.

Computing device 100 also includes processor 102, and may include one or more additional processor(s) 102', for executing software stored in the memory 106 and other programs for controlling system hardware, peripheral devices and/or peripheral hardware. Processor 102 and processor(s) 102' each can be a single core processor or multiple core (104 and 104') processor. Virtualization may be employed in computing device 100 so that infrastructure and resources in the computing device can be shared dynamically. Virtualized processors may also be used with executable code 150 and other software in storage device 116. A virtual machine 114 may be provided to handle a process running on multiple processors so that the process appears to be using only one computing resource rather than multiple. Multiple virtual machines can also be used with one processor.

A user may interact with computing device 100 through a visual display device 122, such as a computer monitor, which may display a user interface 124 or any other interface. The user interface 124 of the display device 122 may be used to display phase-contrast images, quantitative phase images, fluorescence images, composite images and/or user controls for controlling various peripheral devices. The visual display device 122 may also display other aspects or elements of exemplary embodiments (e.g., an icon for storage device 116). Computing device 100 may include other I/O devices such a keyboard or a multi-point touch interface (e.g., a touchscreen) 108 and a pointing device 110, (e.g., a mouse, trackball and/or trackpad) for receiving input from a user. The keyboard 108 and the pointing device 110 may be connected to the visual display device 122 and/or to the computing device 100 via a wired and/or a wireless connection. Computing device 100 may include other suitable conventional I/O peripherals.

In some embodiments, computing device 100 receives information (e.g., data or images) from, and/or sends information to, any of a first imaging system, a second imaging system (imaging system(s) 170), a first light source, a second light source, a microscope (microscope/light source(s) 160) and/or an alignment detector 180 via a wired connection, via a wireless connection and/or via physical transfer of a storage device (e.g., a flash drive). In some embodiments, computing device 100 includes executable code for controlling one or more aspects of the first imaging system and/or the second imaging system (e.g., an acquisition rate, an image resolution, etc.). In some embodiments, the imaging system itself may include a user interface for controlling imaging parameters (e.g., an acquisition rate, an image resolution, etc.). In some embodiments, parameters of light source(s), such as brightness, may be observed and/or controlled using the computing device 100. For a microscope that is digitally controlled, parameters of the microscope (e.g., focus or filtering) may be observed and or controlled using the computing device 100.

Computing device 100 may include a network interface 112 to interface with a network device 126 via a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 112 may include a built-in network adapter, network interface card, PCMCIA network card, card bus network adapter, wireless network adapter, USB network adapter, modem or any other device suitable for enabling computing device 100 to interface with any type of network capable of communication and performing the operations described herein.

Moreover, computing device 100 may be any computer system such as a workstation, desktop computer, server, laptop, handheld computer or other form of computing or telecommunications device that is capable of communication and that has sufficient processor power and memory capacity to perform the operations described herein.

Computing device 100 can be running any operating system 118 such as any of the versions of the MICROSOFT WINDOWS operating systems, the different releases of the Unix and Linux operating systems, any version of the MACOS for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Example System

The inventors designed and constructed an example system similar to system 10 depicted in FIG. 1. The example system used three different coherent monochromatic light sources with red, yellow and green wavelengths to illuminate samples. A transmission microscope including an objective and a tube lens was used to collect light diffracted by a samples and light not diffracted by the sample. The system included a first lens having a focal length of 60 mm and a second lens having a focal length of 60 mm. At the focal plane of the first lens, the system included a phase plate with a central region including a highly refractive material (ITO or TiN) and a peripheral region including a less diffractive material such as glass. The system employed a standard RGB CCD camera to simultaneously collect phase-contrast images having red, green and blue light.

Figure 13:
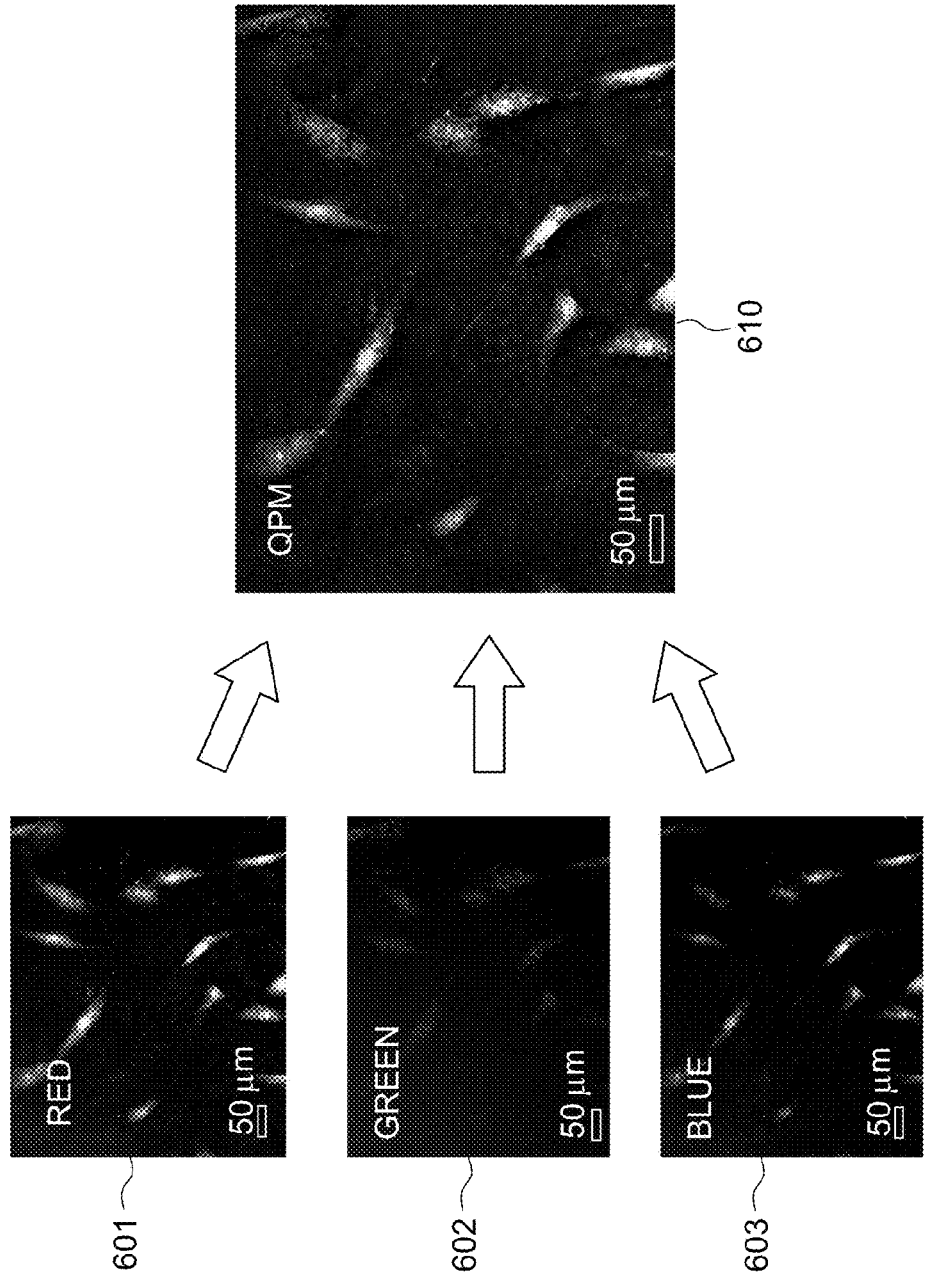
FIG. 13 includes phase-contrast images of rat mesenchymal stem cells for three different colors of light and a quantitative phase microscopy image (QPM) produced from the phase-contrast images, in accordance with some embodiments.

FIG. 13 shows phase-contrast images of a sample including rat mesenchymal stem cells that are fixed on a cover slip. The phase-contrast images were obtained using the example system described above. For illustrative purposes phase-contrast images 601, 602 and 603 in FIG. 13 have been inverted resulting in a black background. Of the three phase-contrast images, image 601 produced from red light had the best phase-contrast and image 603 produced from blue light had the worst phase-contrast. The red 601, green 602 and blue 603 phase contrast images were used to produce a two-dimensional quantitative phase-contrast microscopy (QPM) image 610 in which the quantitative phase information is indicated by the image intensity at each location with black corresponds to zero phase shift at a location and white corresponds to the highest phase shift at a location. The QPM image 610 has sufficient contrast between cell bodies and background for automated segmentation and similar automated processing techniques.

Figure 14:
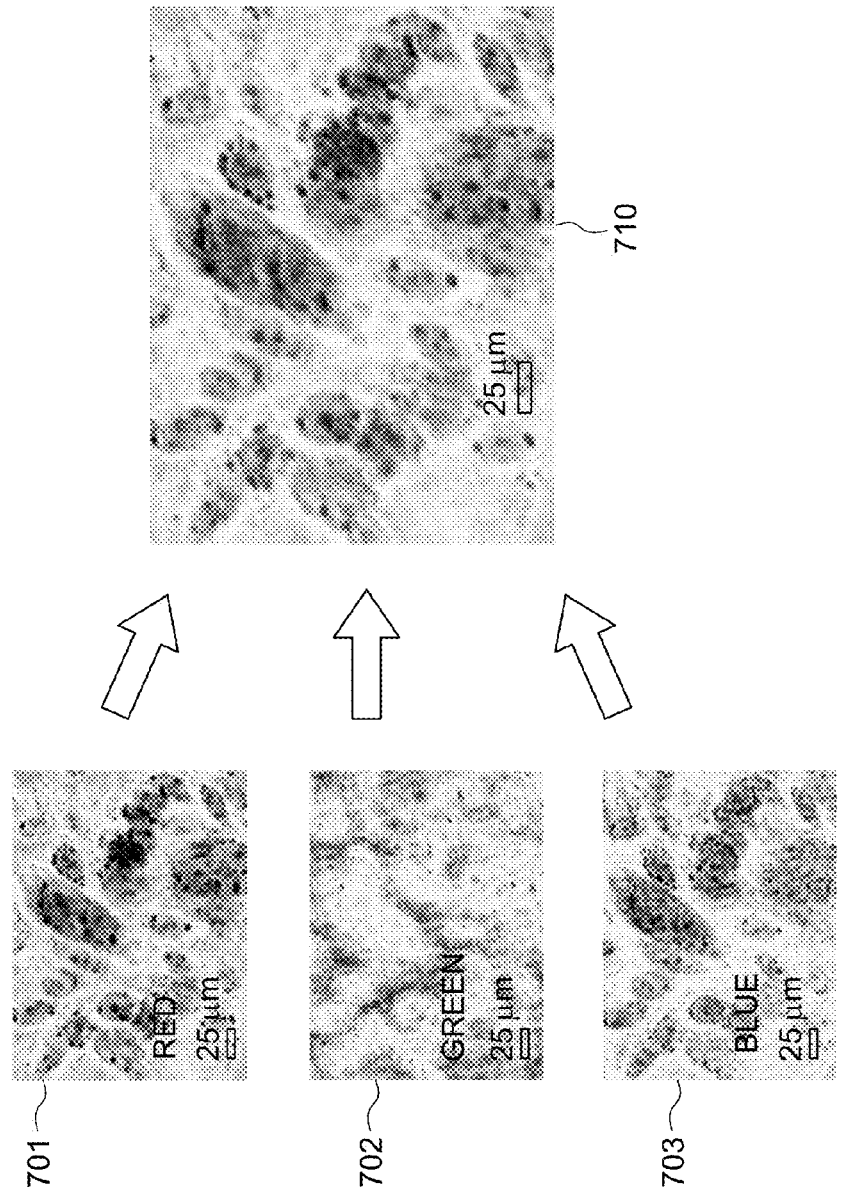
FIG. 14 includes phase-contrast images of Chinese hamster ovary (CHO) cells for three different colors of light and a quantitative phase microscopy image (QPM) produced from the phase-contrast images, in accordance with some embodiments.

FIG. 14 shows phase-contrast images of a sample including Chinese hamster ovary (CHO) cells that are fixed in a well of a ninety-six well plate. The phase-contrast images were obtained using the example system described above. Phase contrast images 701, 702, 703 in FIG. 14 have not been inverted, meaning that white at a location corresponds to no phase shift due to the sample at the location. Of the three phase-contrast images, image 701 produced from red light had the best phase-contrast. The red 701, green 702 and blue 703 images were used to produce a two-dimensional quantitative phase-contrast microscopy (QPM) image 710 in which the intensity corresponds to quantitative phase at each location. The QPM image 710 has sufficient contrast between cell bodies and background for automated segmentation and similar automated processing techniques.

A. Comparison with Images from Prior Art Systems

Figure 15:
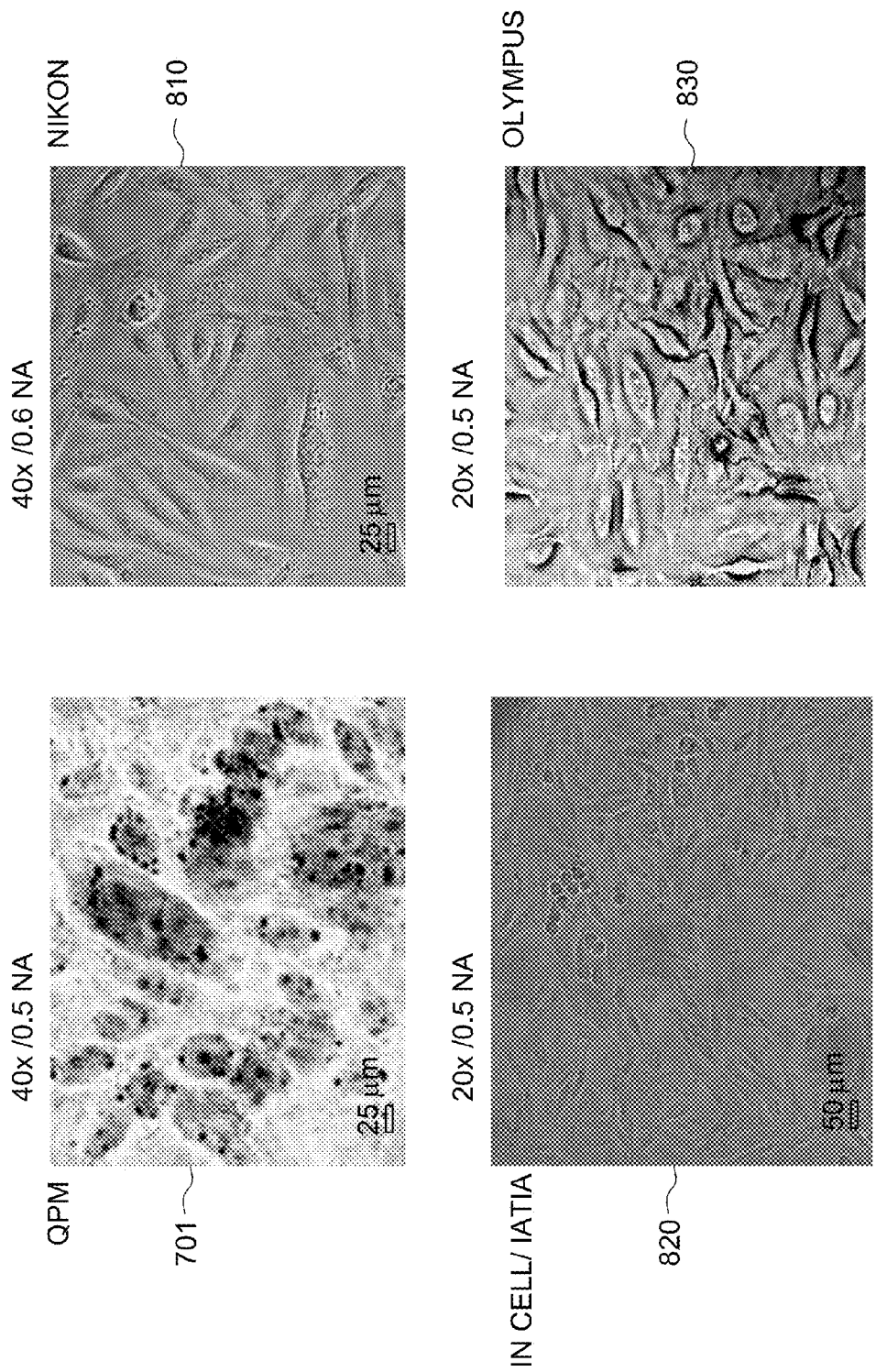
FIG. 15 compares a QPM image obtained in accordance with some embodiments with comparable images from prior art system.

FIG. 15 shows a comparison of the QPM 710 image of the CHO cells, obtained with 40× magnification and a numerical aperture of 0.5, with other phase-contrast images of the same cells using various prior art systems. Image 810 was obtained with a conventional phase-contrast NIKON microscope with 40× magnification and a numerical aperture of 0.6. Image 830 was obtained using a conventional phase-contrast OLYMPUS microscope with 20× magnification and a numerical aperture of 0.5. Image 820 was obtained using an IN CELL phase-contrast imaging system from IATIA Imaging Pty. Ltd. with 20× magnification and a numerical aperture of 0.5. As can be observed by visual comparison of the images, the QPM image 710 has better contrast between cell bodies and background than the images from the prior art systems.

Figure 16:
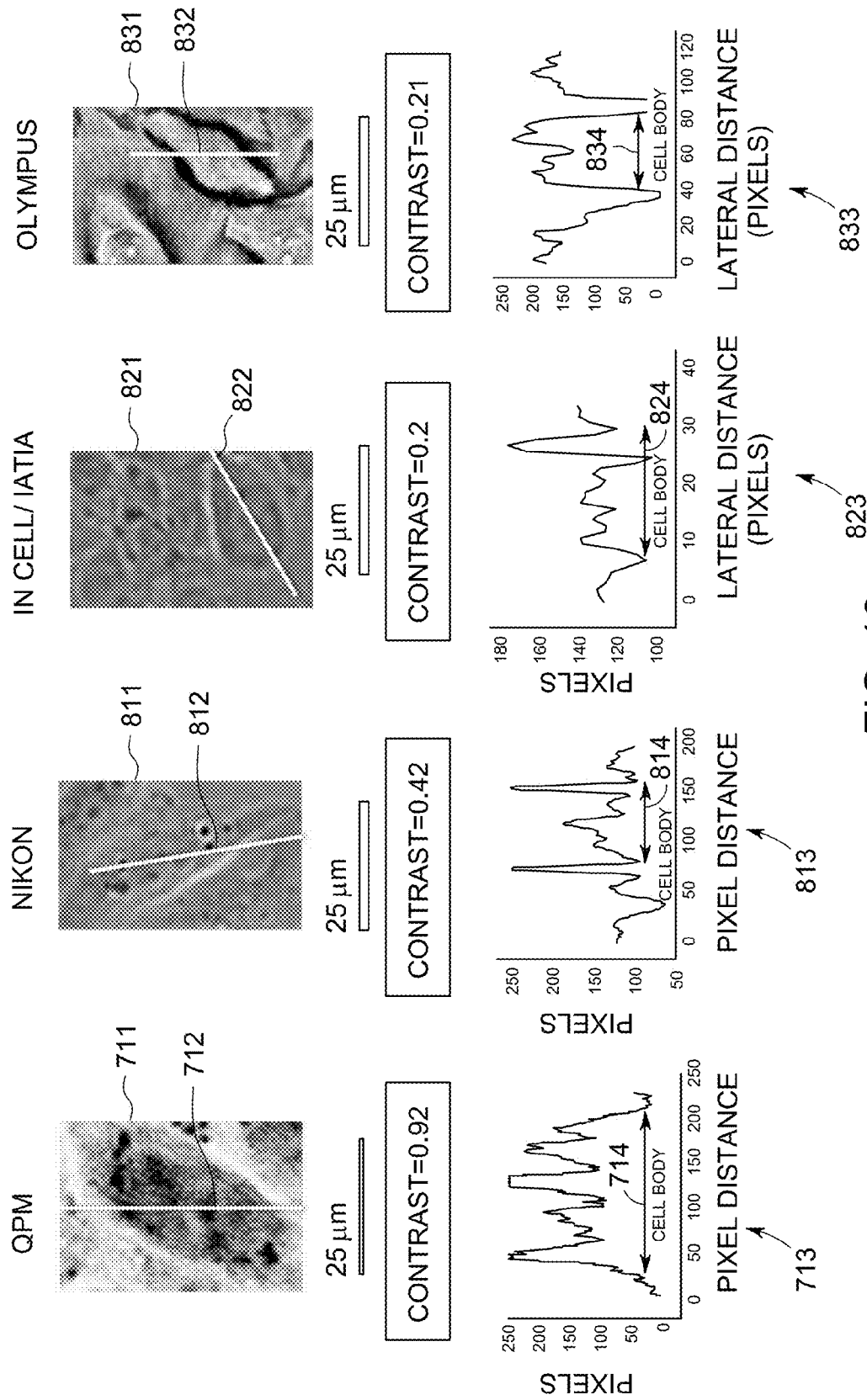
FIG. 16 includes a quantitative comparison of the images of FIG. 15.

FIG. 16 is a quantitative comparison of the contrast between cell bodies and background for the QPM image of the CHO cells 710 and the various prior art images of the CHO cells 810, 820, 830. Image 711 is a detail of the QPM image 710 including a reference line 712 extending across a cell body. In a graph 713 of intensity vs. pixel distance in QPM image 711 along line 712, the intensity for pixels within the cell body (i.e., in the range indicated by arrow 714), is markedly higher than the intensity for pixels outside the cell body). Further, the QPM image 710 has a contrast value of 0.92, where contrast is defined as follows $$\rho = \frac{I_{max} - I_{min}}{I_{max} + I_{min}} \quad (9)$$

Because the intensity of the cell body is markedly different than the intensity of the background, QPM image 710 is particularly suitable for automated cell segmentation and analysis.

Image 811 is a detail of the NIKON microscope image 810 including a reference line 812 extending across a cell body. In a graph 813 of intensity vs. pixel distance in the NIKON microscope image 811 along line 812, the intensity for pixels within the cell body (i.e., in the range indicated by arrow 814), is only slightly higher than the intensity for pixels outside the cell body. Further, the NIKON microscope image 810 has a contrast value of 0.42. Thus, the NIKON microscope image 810 is not well suited for automated detection of cell bodies.

Image 821 is a detail of the IN CELL image 820 including a reference line 822 extending across a cell body. In a graph 823 of intensity vs. pixel distance in the IN CELL image 821 along line 812, the intensity for pixels within the cell body (i.e., in the range indicated by arrow 824), is about the same as the intensity for pixels outside the cell body. Further, the IN CELL image 821 has a contrast value of 0.2. Thus, the IN CELL image 820 is not well suited for automated detection of cell bodies.

Image 831 is a detail of the OLYMPUS microscope image 830 including a reference line 832 extending across a cell body. In the graph 833 of intensity vs. pixel distance in the OLYMPUS microscope image 831 along line 832, the intensity for pixels within the cell body (i.e., in the range indicated by arrow 834), is about the same as the intensity for pixels outside the cell body. Further, the OLYMPUS microscope image 831 has a contrast value of 0.21. Thus, the OLYMPUS microscope image 830 is not well suited for automated detection of cell bodies.

B. Phase Plate Parameters

The inventors also explored different phase plate parameters (lateral dimensions, thickness, high diffusivity materials). The inventors recognized that a desirable phase plate design has parameters that result in a high contrast image with low losses to absorption for the undiffused light. The table below includes various combinations of thickness and lateral dimensions of a thin film of the high diffusivity material for different high diffusivity materials, the resulting image contrast, and absorption coefficients of the thin film for red, green and blue light.

| Phase Plate | Thickness | Size | Material | Image Contrast (ρ) | Absorption Coefficient (k) |
|---|---|---|---|---|---|
| A | 420 nm | 200 μm × 200 μm | ITO | 0.66 | 0.04 (B) 0.04 (G) 0.06 (R) |
| B | 350 nm | 100 μm × 100 μm | ITO | 1.0 | 0.04 (B) 0.04 (G) 0.06 (R) |
| C | 350 nm | 200 μm × 200 μm | ITO | 0.92 | 0.04 (B) 0.04 (G) 0.06 (R) |
| D | 350 nm | 300 μm × 300 μm | ITO | 0.7 | 0.04 (B) 0.04 (G) 0.06 (R) |
| E | 175 nm | 200 μm × 200 μm | TiN | 0.9 | 1.0 (B) 1.8 (G) 2.7 (R) |

Phase plate A, which had a thin film of ITO with thickness of 420 nm and an area of 200 μm×200 μm exhibited a relatively low image contrast of 0.66. Phase plate B, which had a thin film of ITO with a thickness of 350 nm and a lateral size of 100 μm×100 μm exhibited a maximal image contrast of 1.0. Phase plate C, which had a thin film of ITO with a thickness of 350 nm and a lateral size of 200 μm×200 μm exhibited a slightly lower, but still relatively high image contrast of 0.92. Phase plate D, which had a thin film of ITO with a thickness of 350 nm and a lateral size of 300 μm×300 μm exhibited a significantly lower image contrast of 0.7. ITO has relatively low absorption coefficients of 0.04 for blue light, 0.04 for green light and 0.06 for red light. In contrast, TiN has relatively high absorption coefficients of 1.0 for blue light, 1.8 for green light and 2.87 for red light. Phase plate E, which had a thin film of TiN with a thickness of 175 nm and a lateral size of 200 μm×200 μm exhibited a relatively high contrast of 0.9. However, the relatively high absorption coefficients of TiN may make phase plate E a less desirable option. Of the phase plates listed above, plates B and C had the best combination of high image contrast and low absorption coefficient.

Figure 17:
FIG. 17 is a table comparing experimentally determined image contrast values for phase plates having different lateral dimensions for a sample of CHO cells and a sample of stem cells obtained with exemplary systems.

FIG. 17 includes images of samples of CHO cells and rat mesenchymal stem cells obtained with phase plates including 350 nm thick ITO films having different lateral dimensions at 20× magnification with a numerical aperture of 0.5. FIG. 17 illustrates how increasing the lateral dimensions of the ITO film can decrease the image contrast. For an ITO film of 100 μm×100 μm the image contrast (ρ) for the CHO cells and the stem cells was a maximum of 100%. When the size of the ITO film increased to 200 μm×200 μm, the image contrast (ρ) dropped to 85% for the CHO cells and 88% for the stem cells. When the size of the ITO film was further increased to 300 μm×300 μm, the image contrast (ρ) dropped to 75% for the CHO cells and 78% for the stem cells.

Figure 18:
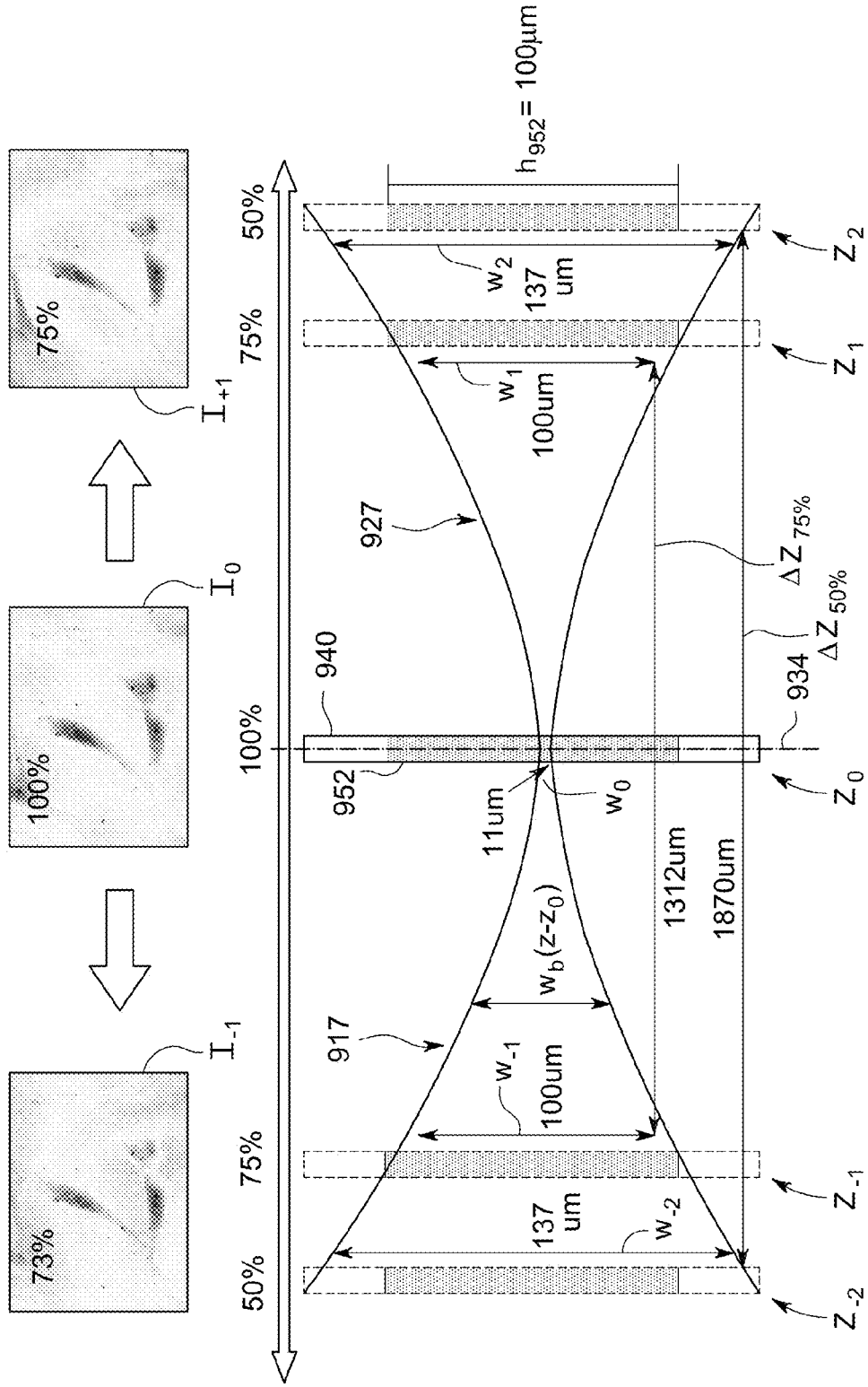
FIG. 18 schematically depicts the effect of phase plate offset from the focal plane on images from an exemplary system.

In experimental conditions, a phase plate may not be exactly at the focal plane. Shift the phase plate from the focal plane decreases image contrast. This is illustrated in FIG. 18, which schematically illustrates the degradation of image quality for images of rat mesenchymal stem cells at 40× magnification when a 100 μm×100 μm×350 nm ITO phase plate is shifted from the focal plane along the beam path. The beam waist $w_b$ of an undiffracted beam 917 before a focal plane 934 and the beam waist $w_b$ of the shifted undiffracted beam 927 after the focal plane 934 is a function of the position along the beam path (z) relative to the focal plane ($z_0$), which may be written as $w_b(z-z_0)$. At the focal plane (at $z_0$) the beam waist $w_0$ is 11 μm, which is much smaller than the 100 μm lateral dimensions of the thin film of ITO in the central region 952. When the phase plate 940 was in position $z_0$ at the focal plane, the system produced images of the stem cells with a contrast of 100%, as illustrated by image $I_0$. At a position $z_{-1}$, shifted away from the focal plane along the beam path toward the sample, the beam waist was 100 μm, which was about the same size as the lateral dimensions of the thin film. With the phase plate in position $z_{-1}$, the contrast was reduced to about 75%, as illustrated by image $I_{-1}$, which has 73% contrast. When the phase plate was moved further toward the sample along the beam path to position $z_{-2}$, the beam waist was 137 μm, which was larger than the lateral dimensions of the thin film. With the phase plate in position $z_{-2}$, the contrast was reduced to about 50%. When the phase plate was advanced in the z direction past the focal plane, the contrast also decreased. For example, the beam waist at a position $z_1$ was about 100 μm, which was about the same size as the lateral dimensions of the thin film. With the phase plate in position $z_1$, the contrast was reduced to about 75%, as illustrated by image $I_1$ which has 75% contrast. Further along the beam path toward the sample at position $z_2$, the beam waist was 137 μm, which was larger than the lateral dimensions of the thin film. With the phase plate in position $z_2$, the contrast was reduced to about 50%.

FIG. 18 also illustrates how tolerance of phase plate position is determined. The tolerance is defined as how far a phase plate can be shifted away from the focal plane and still obtain at least a specified contrast. For FIG. 18, the 75% tolerance would be ±656 μm or a total range ($\Delta Z_{75\%}$) of 1312 μm, and the 50% tolerance would be ±935 μm or a total range ($\Delta Z_{50}\%$) of 1870 μm. The tolerance depends on the focal length of the lens used to focus the undiffracted light, the magnification used, and the lateral dimensions of the central region (e.g., the highly diffusive material) on the phase plate. The table below shows experimentally determined image contrast values with the phase plate at the focal plane and tolerances for shifting the phase plate based on images of rat mesenchymal stem cells at different magnifications using phase plates having different lateral dimensions.

In the table below, both 20× magnification and 40× magnification show about the same tolerance for shifting the location of the phase plate from the focal plane. This is because one side of the beam was blocked or clipped with a minor or pinhole aperture after the objective to normalize the performance of the 20× and 40 objectives and to simplify alignment on the phase plate.

| | Contrast (%) with wave plate at focal plane; Tolerance for 75% (±z) | | |
|---|---|---|---|
| Size | 4 x magnification | 20 x magnification | 40 x magnification |
| 100 μm × 100 μm | 85% ±1837 μm | 100% ±656 μm | 100% ±656 μm |
| 200 μm × 200 μm | 79% ±413 μm | 88% ±212 μm | 92% ±212 μm |
| 300 μm × 300 μm | 72% ±215 μm | 78% ±70 μm | 78% ±70 μm |

Figure 19:
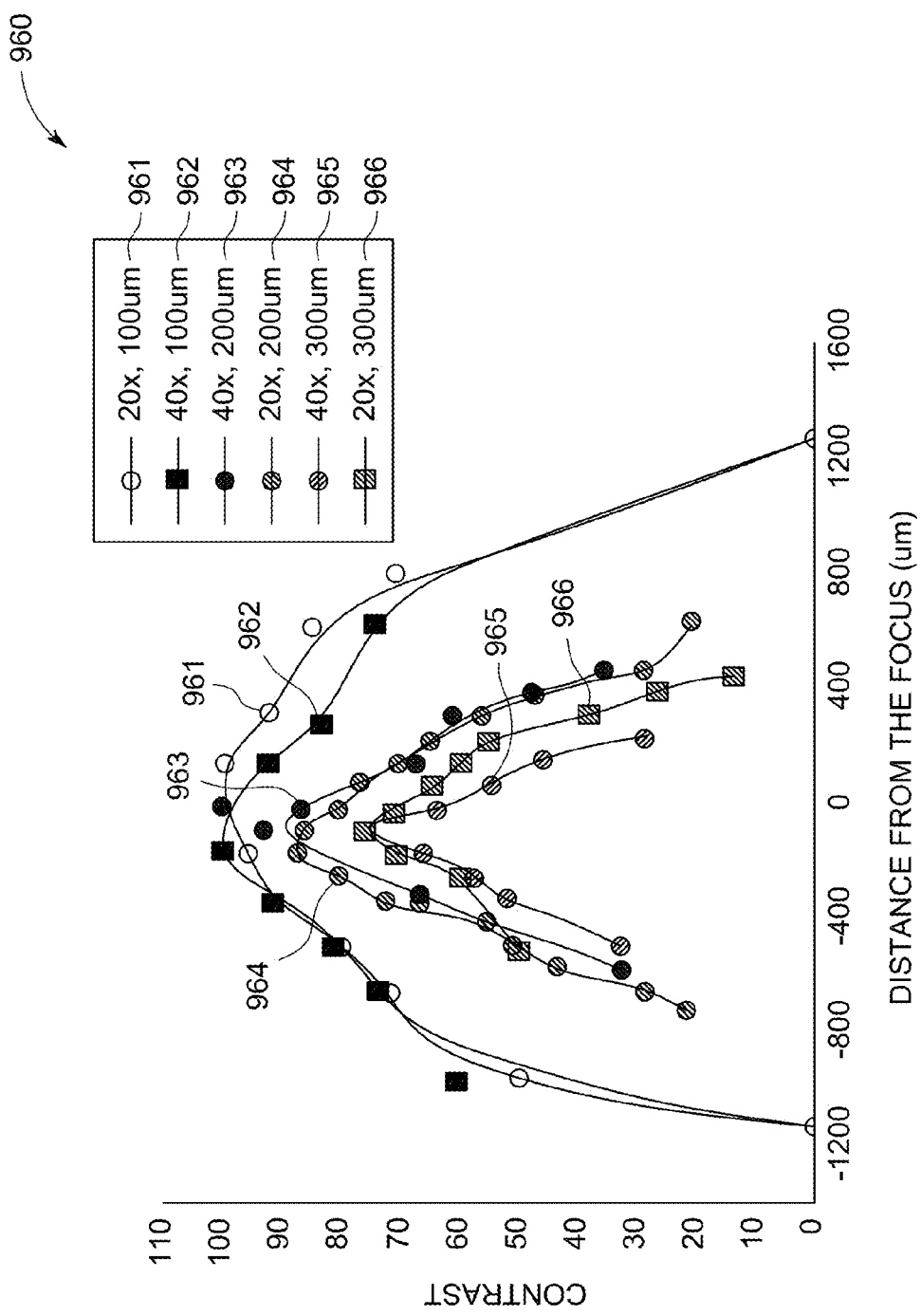
FIG. 19 is a graph of experimentally determined image contrast versus offset from the focal plane for exemplary systems having 20× and 40× magnification and different lateral dimensions of phase plates.
Figure 20:
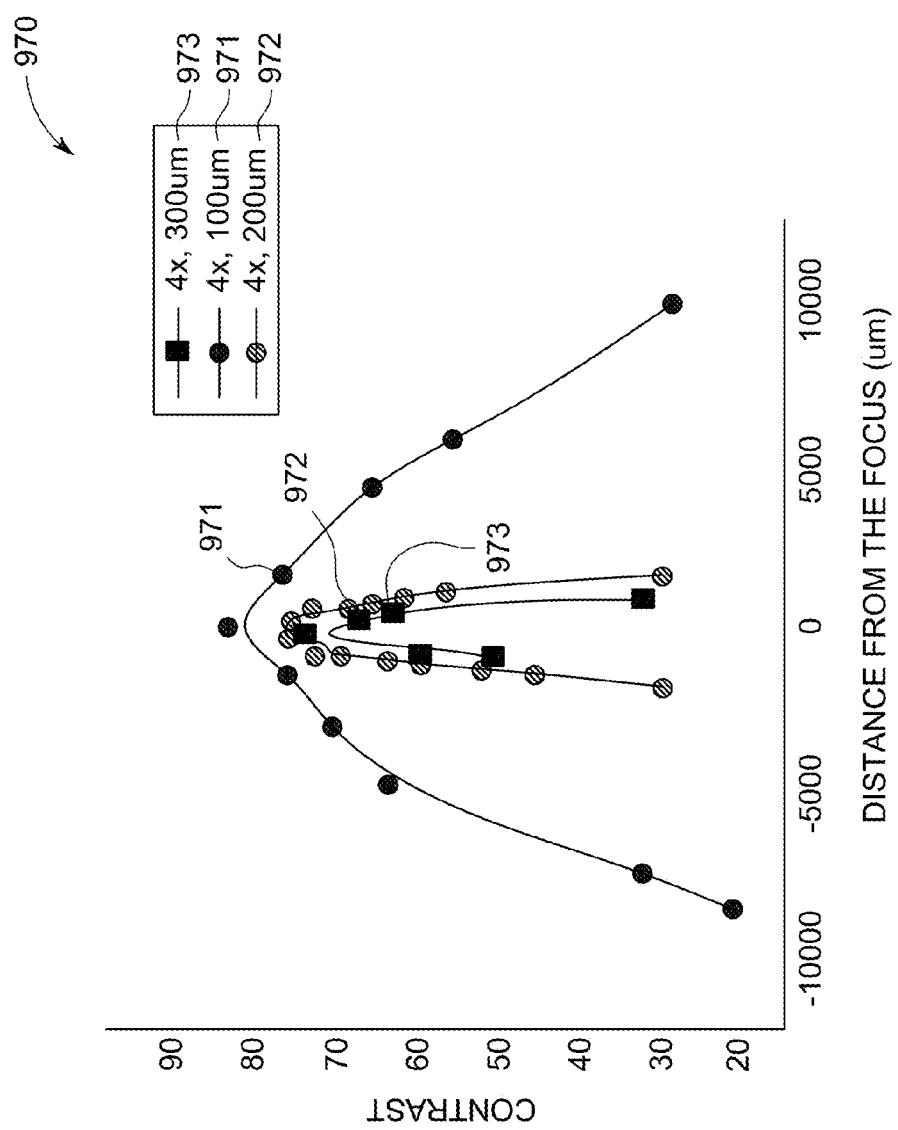
FIG. 20 is a graph of experimentally determined image contrast versus offset from the focal plane for exemplary systems having 4× magnification and different lateral dimensions of phase plates.

FIGS. 19 and 20 include graphs of experimentally measured contrast as a function of the distance of the phase plate from the focal plane for different magnifications and different lateral dimensions of the highly diffractive film obtained using sample of rat mesenchymal cells. Graph 960 in FIG. 19 includes data obtained with 20× magnification and phase plates with highly diffractive films having a lateral dimensions of 100 μm (961), 200 μm (964), and 300 μm (966). Graph 960 also includes data obtained with 40× magnification and with highly diffractive films having a lateral dimensions of 100 μm (962), 200 μm (963), and 300 μm (965). As shown in the graph, contrast values are generally smaller for highly diffractive films having larger lateral dimensions. Generally speaking, the reduction in contrast for displacement away from the focus occurs more sharply for highly diffractive films having larger lateral dimensions.

Graph 970 in FIG. 21 includes data obtained with 4× magnification and phase plates with highly diffractive films having a lateral dimensions of 100 μm (971), 200 μm (972), and 300 μm (973). Graph 970 also shows the trend that contrast values are generally smaller for highly diffractive films having larger lateral dimensions. Graph 970 clearly shows the trend that the reduction in contrast for displacement away from the focus occurs more sharply for highly diffractive films having larger lateral dimensions. Graphs 960 and 970 could be used to determine what lateral dimensions to use for a highly diffractive thin film given a contrast threshold, a desired tolerance for displacement from the focal plane and magnification(s).

While some features of embodiments of the invention have been illustrated and described herein, many modifications and changes will be clear to those of skill in the art based on this application. It is, therefore, to be understood that the appended claims are intended to cover all such modifications and changes as fall within the true spirit of the invention.

Although the claims recite specific combinations of limitations, the invention expressly encompasses each independent claim by itself and also in conjunction with any possible combination of limitations articulated in the related dependent claims except those that are clearly incompatible.

The invention claimed is:

1. A system for phase contrast imaging, the system comprising:
at least one collection optical element in a beam path after a sample illuminated by a light source, the at least one collection optical element configured to collect light diffracted by the sample and to collect light not diffracted by the sample;
a first optical element in the beam path after the at least one collection optical element configured to focus the undiffracted light to a focal plane;
a phase plate at or near the focal plane configured to:
transmit at least a portion of the diffracted light;
transmit and impart a first phase shift to a first portion of the undiffracted light having a frequency in a first frequency range, the first phase shift being relative to a phase of the transmitted diffracted light; and
transmit and impart a second phase shift to a second portion of the undiffracted light having a frequency in a second frequency range different than the first frequency range, the second phase shift being relative to the phase of the transmitted diffracted light and different than the first phase shift; and
a second optical element in the beam path after the phase plate configured to image the transmitted diffracted light and the transmitted undiffracted light onto an imaging system.

2. The system of claim 1, wherein the first phase shift and the second phase shift are selected from a group consisting of: 0, $\pi/2$, $\pi$, and $3\pi/2$.

3. The system of claim 1, wherein the first frequency range and the second frequency range are selected from a group consisting of: a frequency range for red light, a frequency range for blue light, and a frequency range for green light.

4. The system of claim 1, wherein the imaging system is a multiple frequency range imaging system.

5. The system of claim 1, wherein the imaging system is an RGB camera.

6. The system of claim 1, wherein the imaging system is a monochromatic imaging system.

7. The system of claim 1, wherein the system further comprises a light source for producing light having a frequency in the first frequency range and light having a frequency in the second frequency range.

8. The system of claim 1, wherein the phase plate is further configured to transmit and impart a third phase shift to a third portion of the undiffracted light having a frequency in a third frequency range, the third phase shift being relative to the phase of the transmitted diffracted light and different than the first phase shift and the second phase shift.

9. The system of claim 1, wherein the phase plate comprises a liquid crystal.

10. The system of claim 1, wherein the phase plate comprises a central region including a highly dispersive material and a peripheral region including a less dispersive material.

11. The system of claim 10, wherein the highly dispersive material comprises indium tin oxide (ITO).

12. The system of claim 11, wherein the highly dispersive material has a thickness of between 100 nm and 800 nm in the central region.

13. The system of claim 10, wherein, wherein the highly dispersive material comprises titanium nitride (TiN).

14. The system of claim 13, wherein the highly dispersive material has a thickness of between 50 nm and 500 nm in the central region.

15. The system of claim 10, wherein the central region has lateral dimensions of between 50 microns and 600 microns.

16. The system of claim 10, wherein the central region has lateral dimensions of between 50 microns and 350 microns.

17. The system of claim 1, wherein the system is configured for label-free, high-contrast imaging of samples including one or more cells.

18. The system of claim 17, wherein the system is configured to produce phase-contrast images of samples with sufficient contrast for auto-segmentation.

19. The system of claim 1, wherein the at least one collection optical element is further configured to collect fluorescent light emitted by the sample; and wherein the system further comprises:
a dichroic element for dividing light from the at least one collection optical element into a first beam including light from the first light source diffracted by the sample and light from the first light source that is not diffracted by the sample, and a second beam including fluorescence light emitted by the sample, and wherein the first optical element, the phase plate and the second optical element are along a path of the first beam; and
one or more optical elements in a path of the second beam configured to focus the fluorescent light onto a second imaging system.

20. The system of claim 1, further comprising at least one fluorescence collection optical element configured to collect fluorescent light emitted by the sample.

21. A system for phase contrast imaging, the system comprising:
at least one collection optical element in a beam path after a sample that is illuminated by a light source, the at least one collection optical element configured to collect light diffracted by the sample and to collect light not diffracted by the sample;

a first optical element in the beam path after the at least one collection optical element configured to focus the undiffracted light to a focal plane;

a phase plate at or near the focal plane configured to:
  transmit at least a portion of the undiffracted light;
  transmit and impart a first phase shift to a first portion of the diffracted light having a frequency in a first frequency range, the first phase shift being relative to a phase of the transmitted undiffracted light; and
  transmit and impart a second phase shift to a second portion of the diffracted light having a frequency in a second frequency range different than the first frequency range, the second phase shift being relative to the phase of the transmitted undiffracted light and the second phase shift being different than the first phase shift; and a second optical element in the beam path after the phase plate configured to image the transmitted undiffracted light and the transmitted diffracted light onto an imaging system.

22. The system of claim 21, wherein the phase plate comprises a peripheral region including a highly dispersive material and central region including a less dispersive material.

23. A method comprising:
capturing a first phase contrast image of a sample from light in a first frequency range diffracted by the sample interfering with light in the first frequency range undiffracted by the sample and given a first relative phase shift by a phase plate;

capturing a second phase contrast image of the sample from light in a second frequency range diffracted by the sample interfering with light in the second frequency range undiffracted by the sample and given a second relative phase shift by the phase plate, wherein the second frequency range is different than the first frequency range and the second relative phase shift is different than the first relative phase shift; and capturing a third phase contrast image of the sample from light in a third frequency range diffracted by the sample interfering with light in the third frequency range undiffracted by the sample and given a third relative phase shift by the phase plate, wherein the third frequency range is different than the first frequency range and the second frequency range, and the third relative phase shift is different than the first relative phase shift and the second relative phase shift.

24. The method of claim 23, wherein the first phase contrast image, the second phase contrast image and the third phase contrast image are captured simultaneously.

25. The method of claim 23, wherein the first frequency range corresponds to red light, the second frequency range corresponds to blue light and the third frequency range corresponds to green light.

26. The method of claim 23, wherein the first relative phase shift, the second relative phase shift and the third relative phase shift are selected from a group consisting of: $0$, $\pi/2$, $\pi$ and $3\pi/2$.

27. The method of claim 23, further comprising producing a quantitative phase image from the first phase contrast image, the second phase contrast image and the third phase contrast image.

* * * * *